(12) United States Patent
Wilford

(10) Patent No.: US 10,865,025 B2
(45) Date of Patent: Dec. 15, 2020

(54) SEALED PACKAGE CONTAINING A SQUEEZABLE PRODUCT

(71) Applicant: Meta4sys Limited, St Helier (JE)

(72) Inventor: Martyn Sydney Wilford, Sherborne (GB)

(73) Assignee: Meta4sys Limited, St Helier (JE)

( * ) Notice: Subject to any disclaimer, the term of this patent is extended or adjusted under 35 U.S.C. 154(b) by 34 days.

(21) Appl. No.: 15/542,106

(22) PCT Filed: Jan. 8, 2016

(86) PCT No.: PCT/GB2016/050047
§ 371 (c)(1),
(2) Date: Jul. 7, 2017

(87) PCT Pub. No.: WO2016/110715
PCT Pub. Date: Jul. 14, 2016

(65) Prior Publication Data
US 2018/0273267 A1    Sep. 27, 2018

(30) Foreign Application Priority Data

Jan. 9, 2015  (GB) .................................... 1500351.0
Mar. 12, 2015 (GB) .................................... 1504155.1

(51) Int. Cl.
*B65D 75/32*     (2006.01)
*B65D 75/58*     (2006.01)
(Continued)

(52) U.S. Cl.
CPC ........... *B65D 75/326* (2013.01); *A45D 37/00* (2013.01); *A47G 21/004* (2013.01); *A47J 19/02* (2013.01);
(Continued)

(58) Field of Classification Search
CPC .... B65D 75/22; B65D 75/54; B65D 75/5855; B65D 75/36; B65D 75/326; B65D 75/305;
(Continued)

(56) References Cited

U.S. PATENT DOCUMENTS 1,676,102 A     7/1928  Thornton
2,103,389 A *  12/1937  Salfisberg .......... B65D 75/5811
                                                    156/183
(Continued)

FOREIGN PATENT DOCUMENTS

DE        29901266 U1    5/1999
DE     202005015085 U1   12/2005
(Continued)

*Primary Examiner* — Mollie Impink
(74) *Attorney, Agent, or Firm* — Carmody Torrance Sandak & Hennessey LLP

(57) ABSTRACT

There is provided a pack for a product (12) to facilitate the dispensing of a liquid or particulate matter emanating from the product via a first openable portion (17). The pack comprises two films (13, 14) sealed together about a periphery to define a volume in which the product (12) is contained. The films at the openable portion (17) can be peeled apart in order to create an opening, but the size of the opening is limited by the provision of stronger connections (52) on either side of the openable portion.

19 Claims, 18 Drawing Sheets

Figure 22:
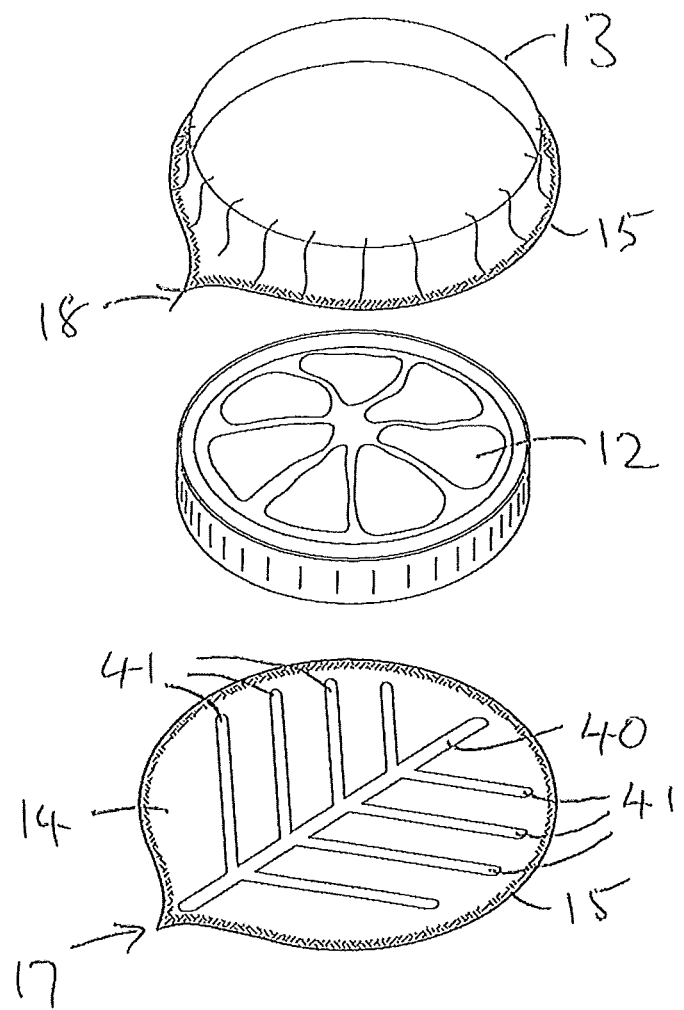

(51) Int. Cl.
| | |
|---|---|
| *B65D 35/14* | (2006.01) |
| *B65D 81/36* | (2006.01) |
| *A47G 21/00* | (2006.01) |
| *B65D 75/52* | (2006.01) |
| *B65D 75/22* | (2006.01) |
| *B65D 77/20* | (2006.01) |
| *A45D 37/00* | (2006.01) |
| *A47J 19/02* | (2006.01) |
| *B65D 35/10* | (2006.01) |
| *B65D 75/04* | (2006.01) |
| *B65D 75/30* | (2006.01) |
| *B65D 85/34* | (2006.01) |
| *A61J 1/14* | (2006.01) |

(52) U.S. Cl.
CPC ............ B65D 35/10 (2013.01); B65D 35/14 (2013.01); B65D 75/04 (2013.01); B65D 75/22 (2013.01); B65D 75/225 (2013.01); B65D 75/30 (2013.01); B65D 75/327 (2013.01); B65D 75/52 (2013.01); B65D 75/5855 (2013.01); B65D 77/2024 (2013.01); B65D 81/36 (2013.01); B65D 85/34 (2013.01); *A61J 1/14* (2013.01); *B65D 2221/00* (2013.01); *B65D 2577/2041* (2013.01); *B65D 2577/2066* (2013.01)

(58) Field of Classification Search
CPC ............ B65D 77/2036; B65D 77/2032; B65D 77/2024; B65D 85/34; B65D 85/72; B65D 83/0055; B65D 83/0094; B65D 2577/2083; B65D 77/2064; B65D 2221/00; A47G 19/02; A47G 19/022; A47G 21/004
USPC ................................ 426/115; 220/231, 359.2
See application file for complete search history.

(56) References Cited

U.S. PATENT DOCUMENTS

| | | | |
|---|---|---|---|
| 2,648,463 A | 8/1953 | Scherer | |
| 2,688,914 A | 9/1954 | Eckler | |
| 3,159,096 A | 12/1964 | Tocker | |
| 3,207,610 A * | 9/1965 | Belkin | B65D 75/22 100/211 |
| 3,669,013 A | 6/1972 | Stein | |
| 3,759,375 A | 9/1973 | Nappi | |
| 3,782,066 A | 1/1974 | Schmitt | |
| 3,917,116 A | 11/1975 | Mason | |
| 4,674,633 A | 6/1987 | Steadman | |
| 4,863,036 A * | 9/1989 | Heijenga | B65D 77/2036 229/123.1 |
| 4,871,091 A * | 10/1989 | Preziosi | A61F 9/0008 222/92 |
| 4,895,296 A | 1/1990 | Trauschke | |
| 4,921,137 A | 5/1990 | Heijenga | |
| 5,154,293 A | 10/1992 | Gould | |
| 5,975,305 A | 11/1999 | Barger | |
| 6,435,374 B1 * | 8/2002 | Tabaroni | B65D 75/32 222/107 |
| D487,698 S * | 3/2004 | Rasmussen | D9/696 |
| 7,044,301 B2 * | 5/2006 | Houze | B65D 75/52 206/440 |
| 7,552,823 B2 * | 6/2009 | Schuehrer | A45D 34/04 206/469 |
| 8,535,744 B1 | 9/2013 | Taghaddos | |
| 8,752,730 B2 * | 6/2014 | Newman | B65D 75/525 222/1 |
| 2007/0119862 A1 | 5/2007 | Backes et al. | |
| 2008/0063325 A1 * | 3/2008 | Miller | B65D 75/20 383/211 |
| 2009/0071979 A1 * | 3/2009 | Sharp | B65D 5/54 222/107 |
| 2009/0114677 A1 * | 5/2009 | Stuart | B65D 75/5811 222/94 |
| 2010/0115891 A1 | 5/2010 | Sharp et al. | |
| 2011/0079609 A1 | 4/2011 | Lee | |
| 2011/0226139 A1 * | 9/2011 | Fukui | B65B 9/12 99/485 |
| 2012/0223099 A1 | 9/2012 | Sanchez | |
| 2013/0015085 A1 | 1/2013 | Morimoto et al. | |
| 2013/0341350 A1 | 12/2013 | Montarras et al. | |
| 2014/0138382 A1 * | 5/2014 | Willemsen | B65D 75/58 220/266 |
| 2014/0228785 A1 | 8/2014 | Soll et al. | |

FOREIGN PATENT DOCUMENTS

| | | |
|---|---|---|
| DE | 202007010049 U1 | 9/2007 |
| DE | 20201108630 U1 | 2/2012 |
| EP | 003390 A1 | 8/1979 |
| EP | 0303500 A2 | 2/1989 |
| EP | 2085322 A1 | 8/2009 |
| EP | 2279964 A1 | 2/2011 |
| FR | 2773683 A1 | 7/1999 |
| GB | 991495 | 5/1965 |
| GB | 2343440 A | 5/2000 |
| GB | 2478109 A | 8/2011 |
| JP | 2001018989 | 1/2001 |
| JP | 2002104541 A | 4/2002 |
| JP | 2008247420 A | 10/2008 |
| JP | 4190185 B2 | 12/2008 |
| WO | 199948768 | 9/1999 |
| WO | 200126994 A1 | 4/2001 |
| WO | 200176973 A2 | 10/2001 |
| WO | 2002070352 A2 | 9/2002 |
| WO | 2003094680 A1 | 11/2003 |
| WO | 2006117178 A1 | 11/2006 |
| WO | 2007126817 A2 | 11/2007 |
| WO | 2009006690 A1 | 1/2009 |
| WO | 2010123581 A2 | 10/2010 |

* cited by examiner

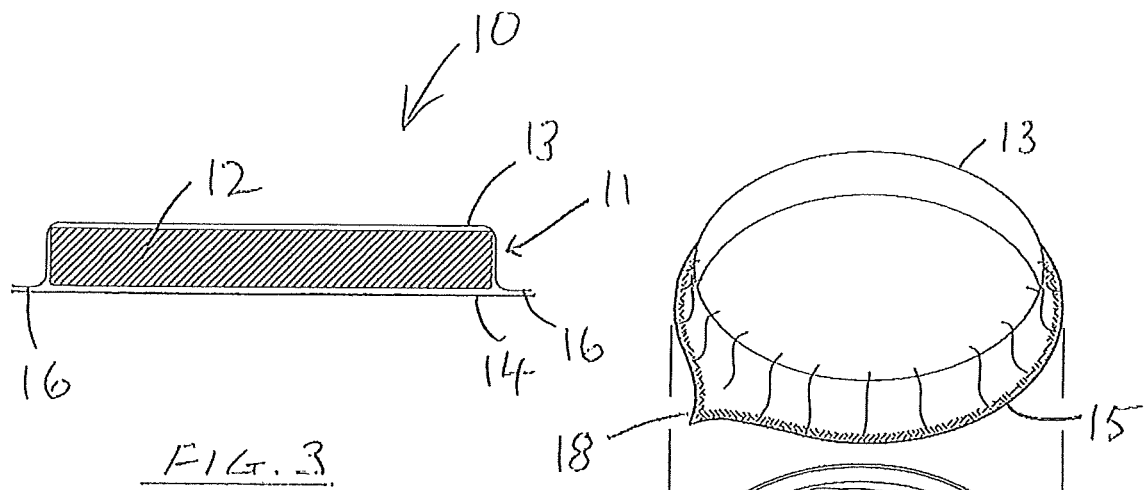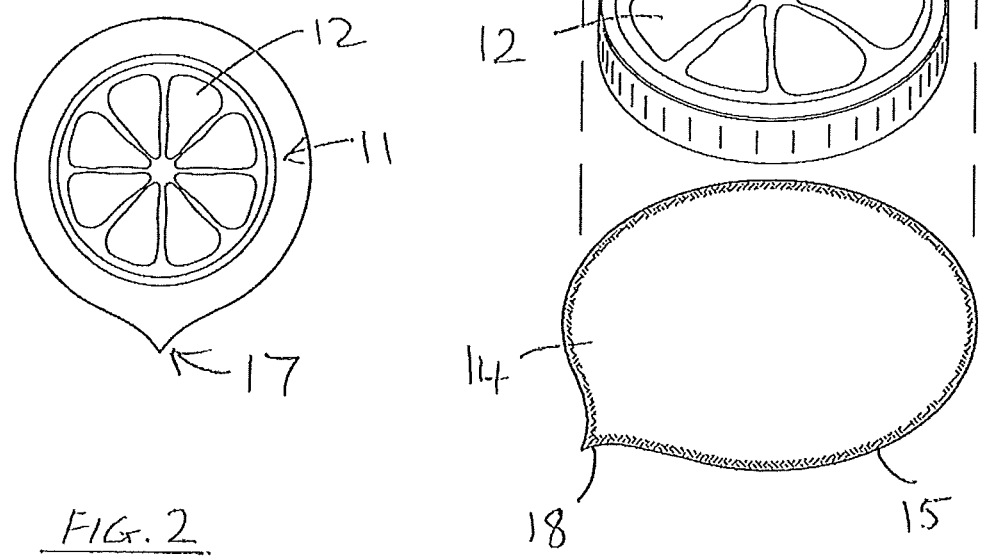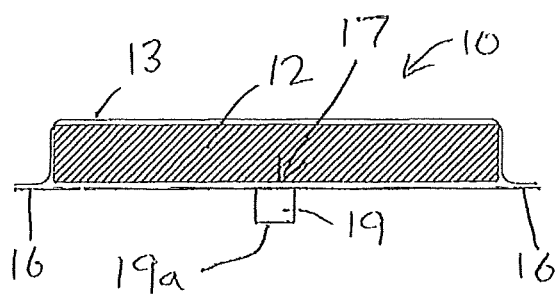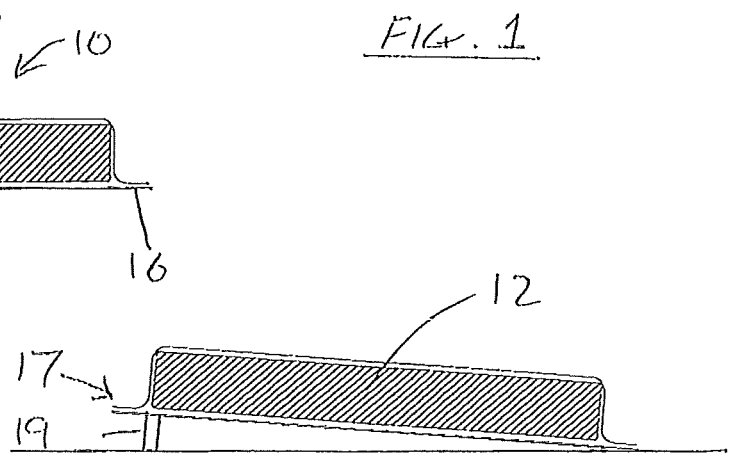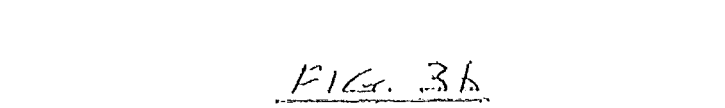

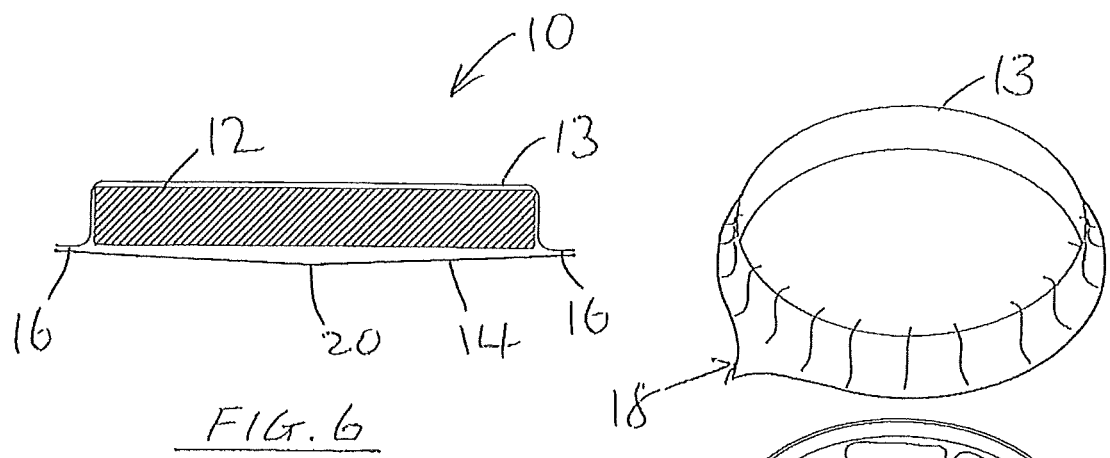
FIG. 6
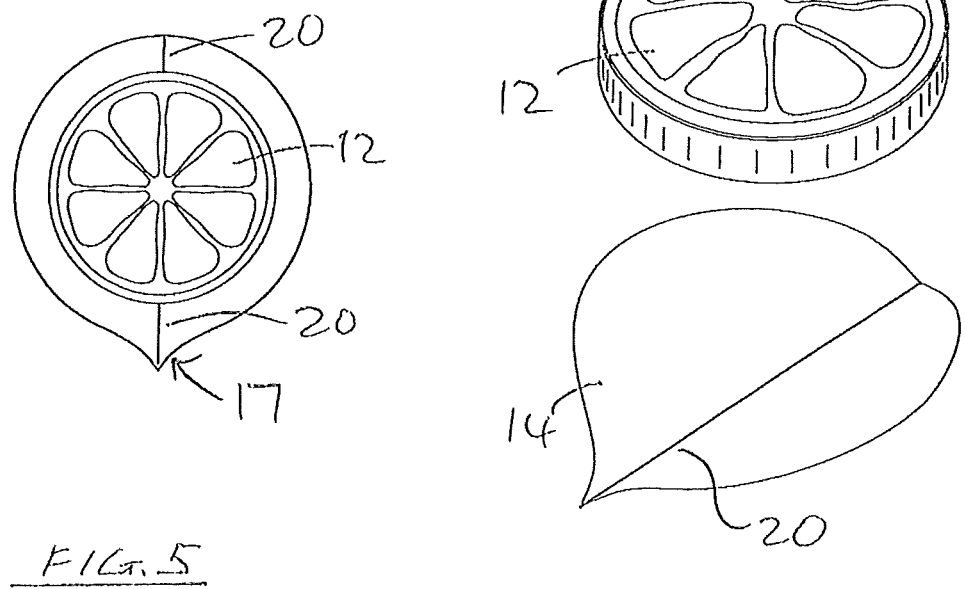
FIG. 5
FIG. 4

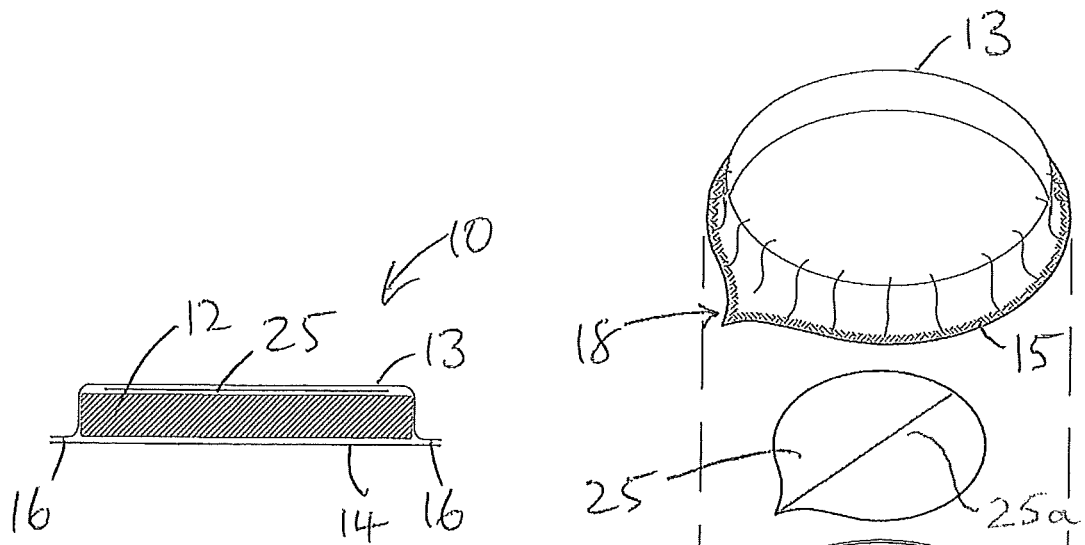
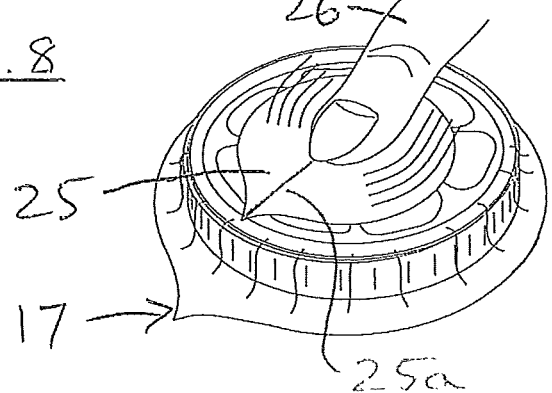
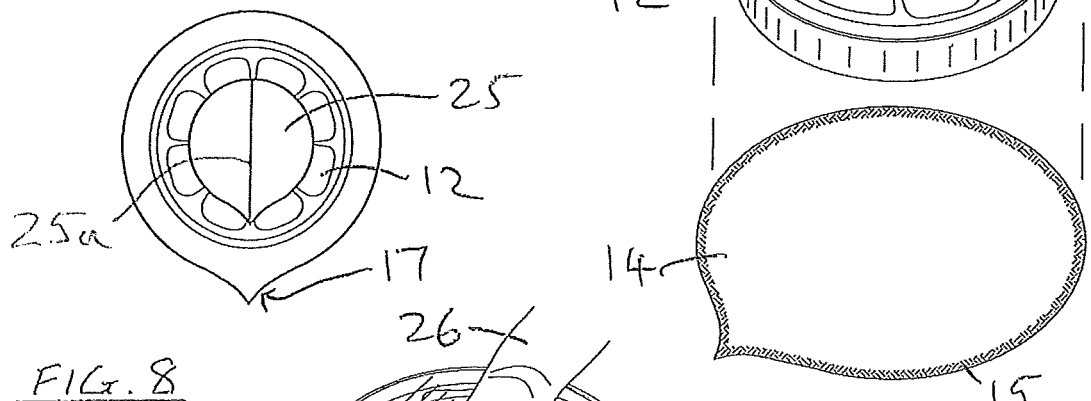

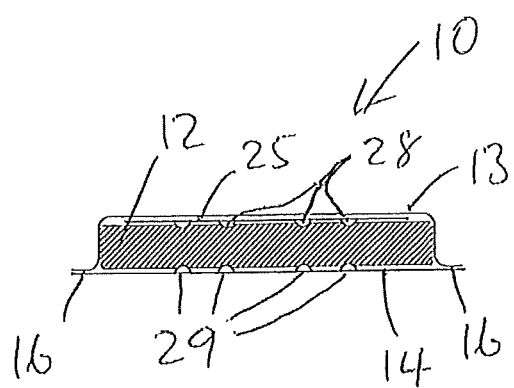
FIG. 12
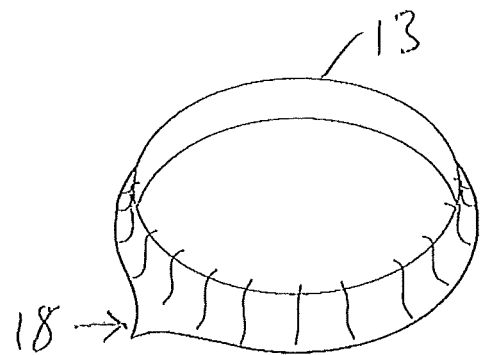
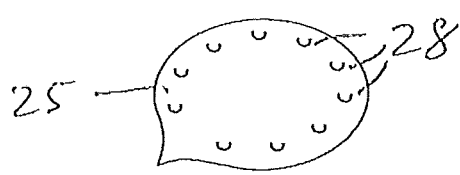
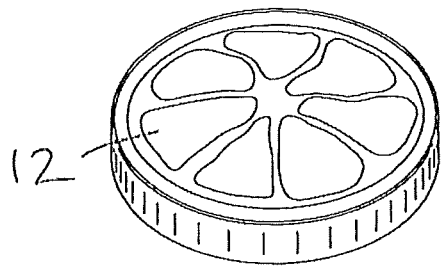
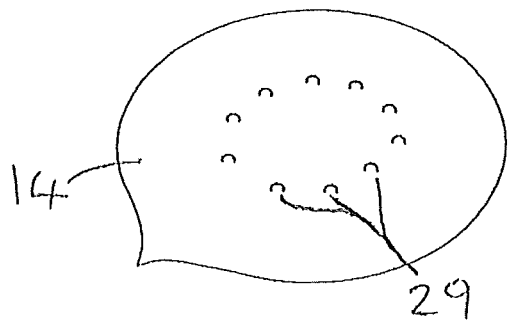
FIG. 11

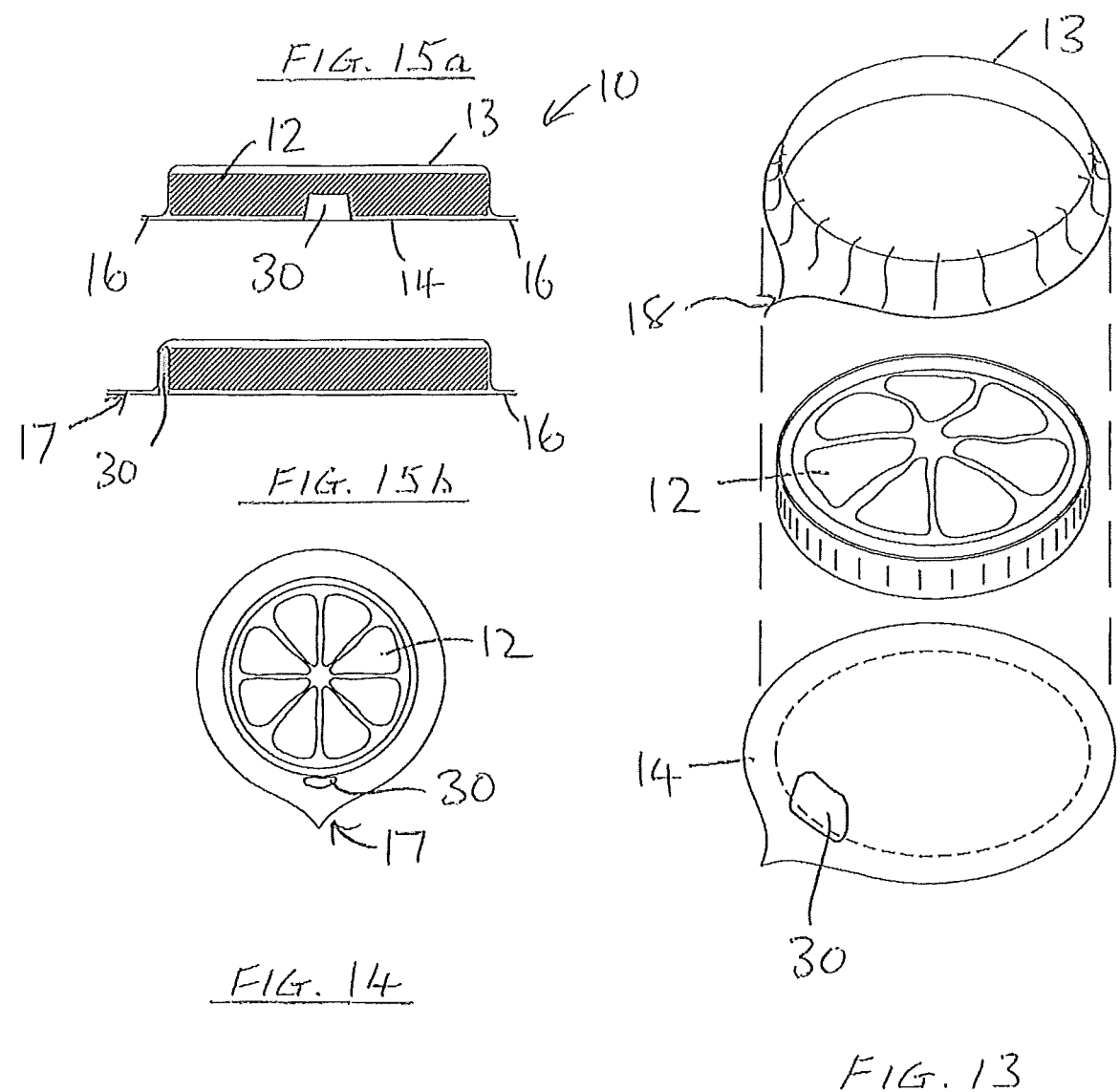

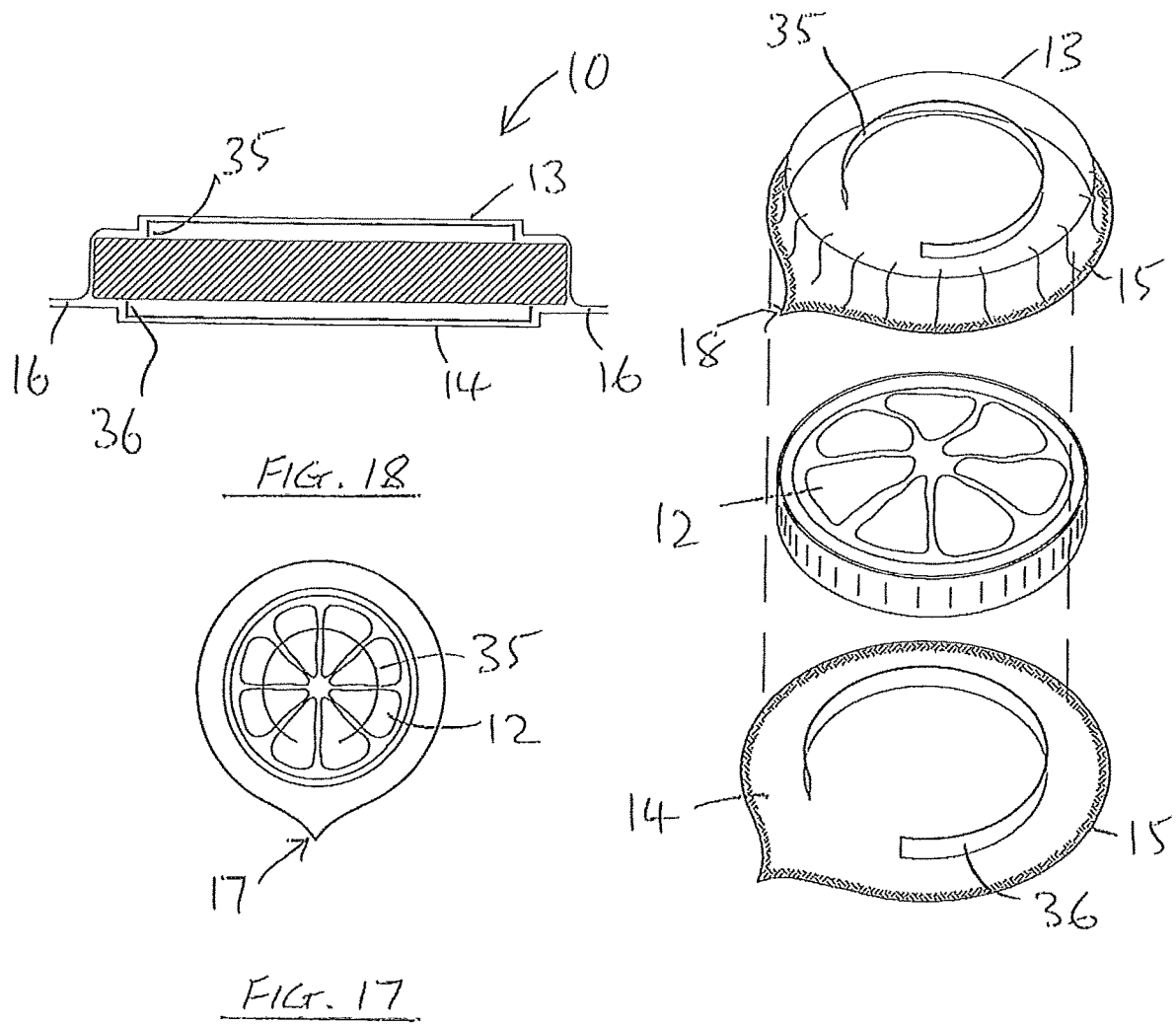

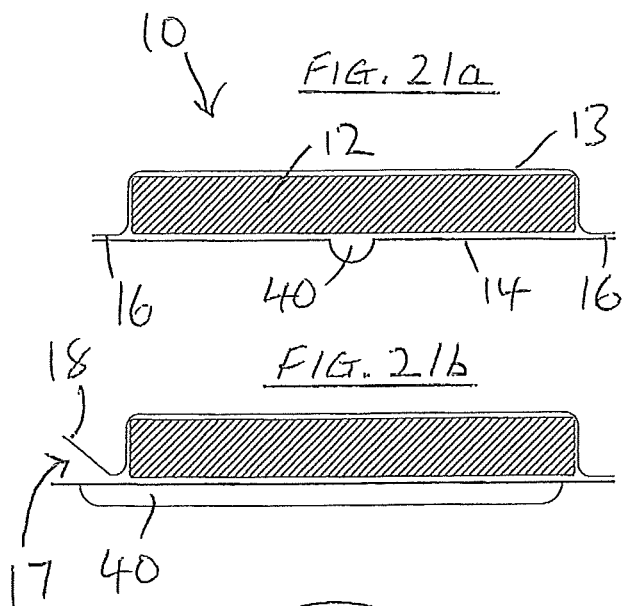
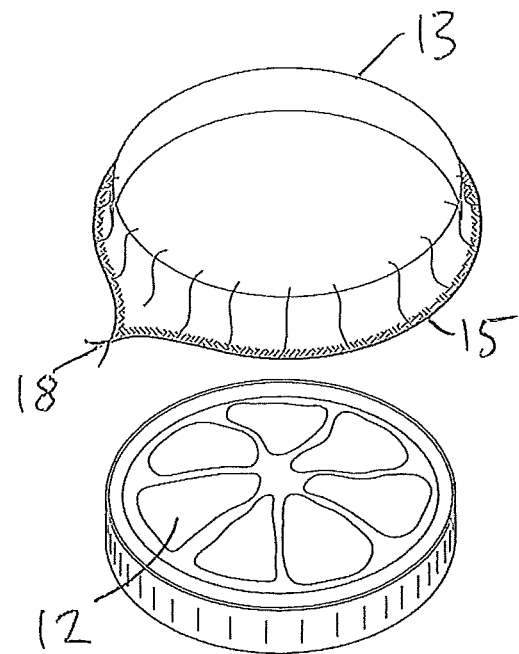
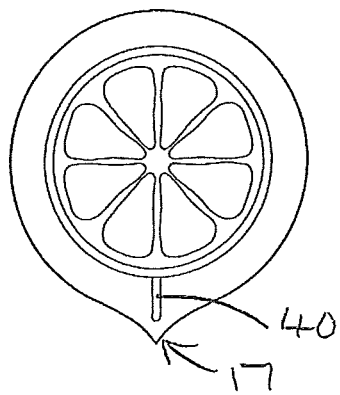
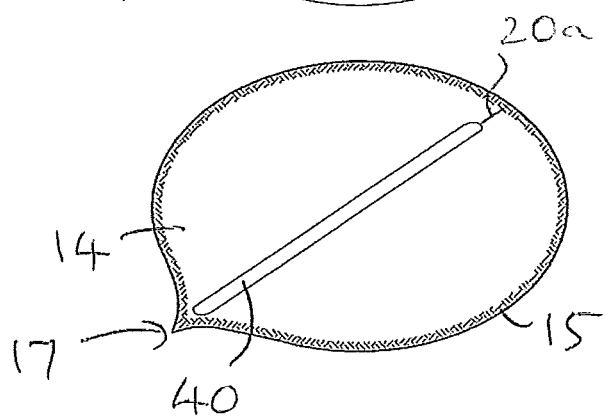
FIG. 20
FIG. 19

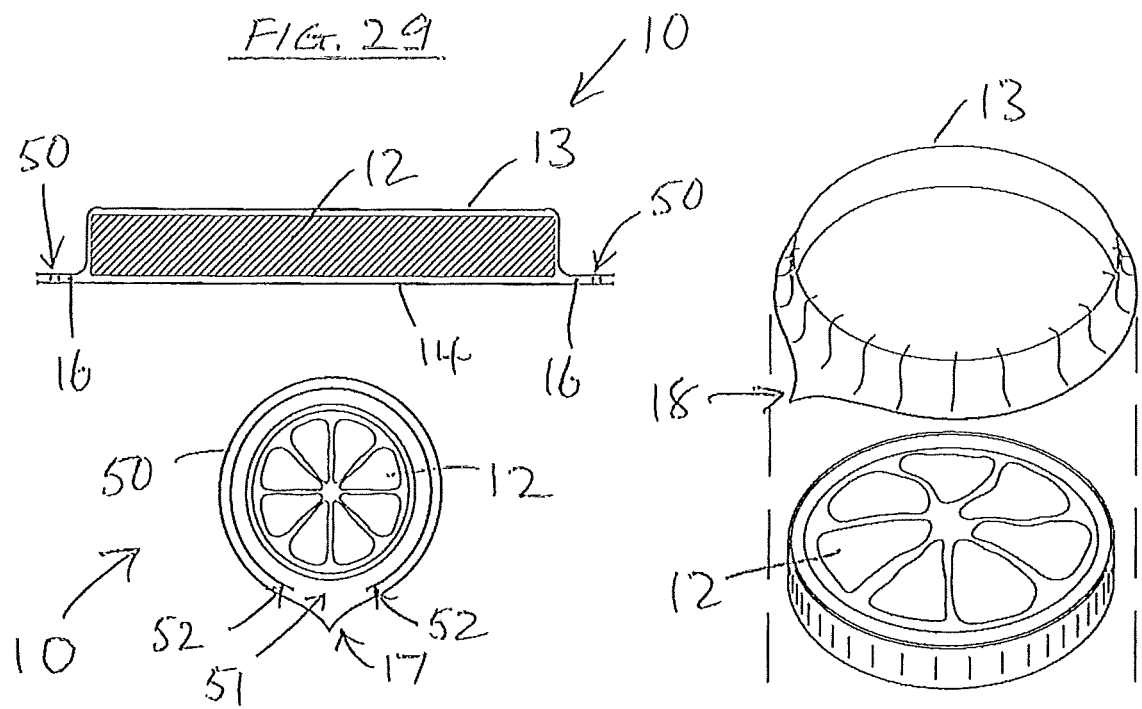
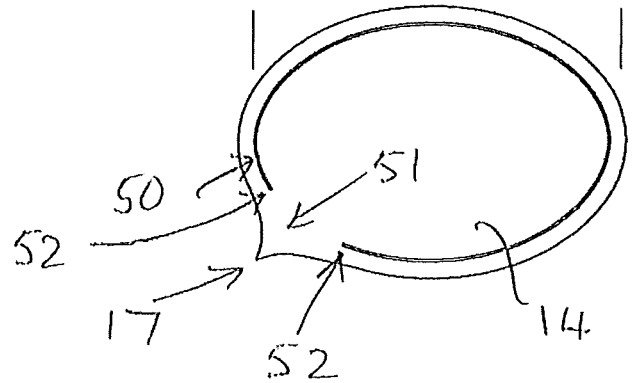

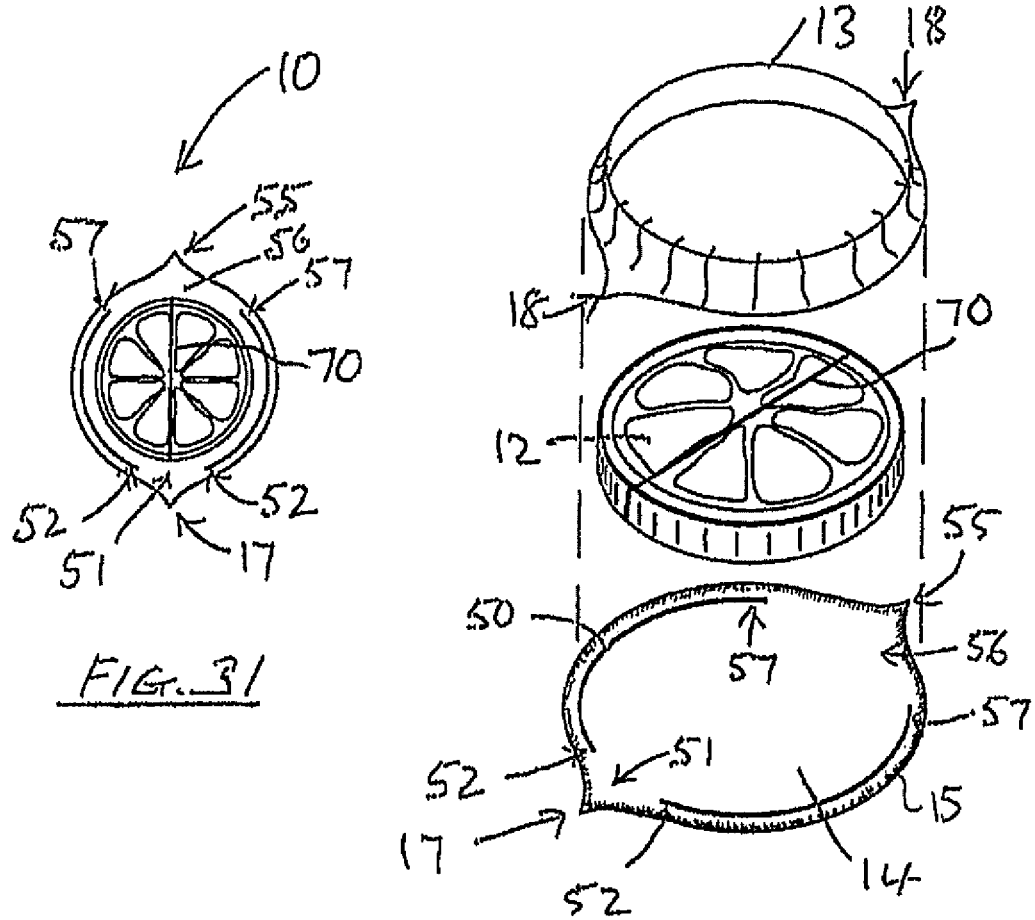

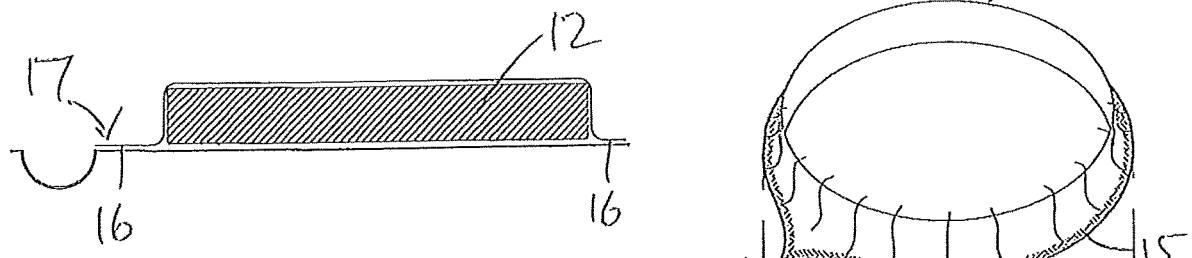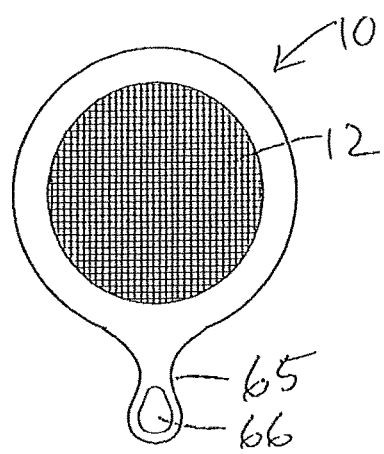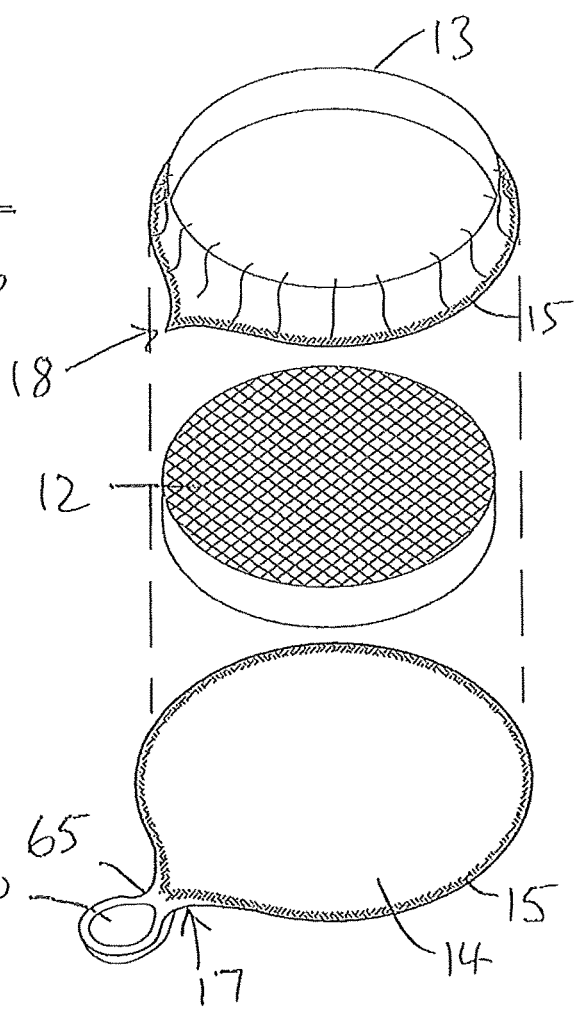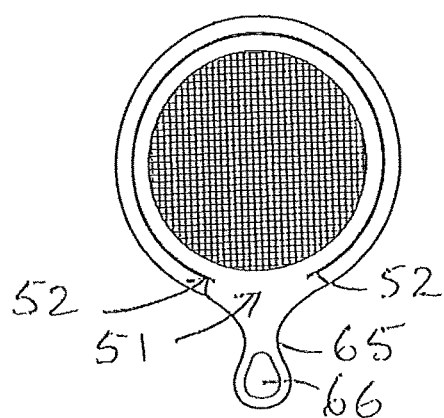

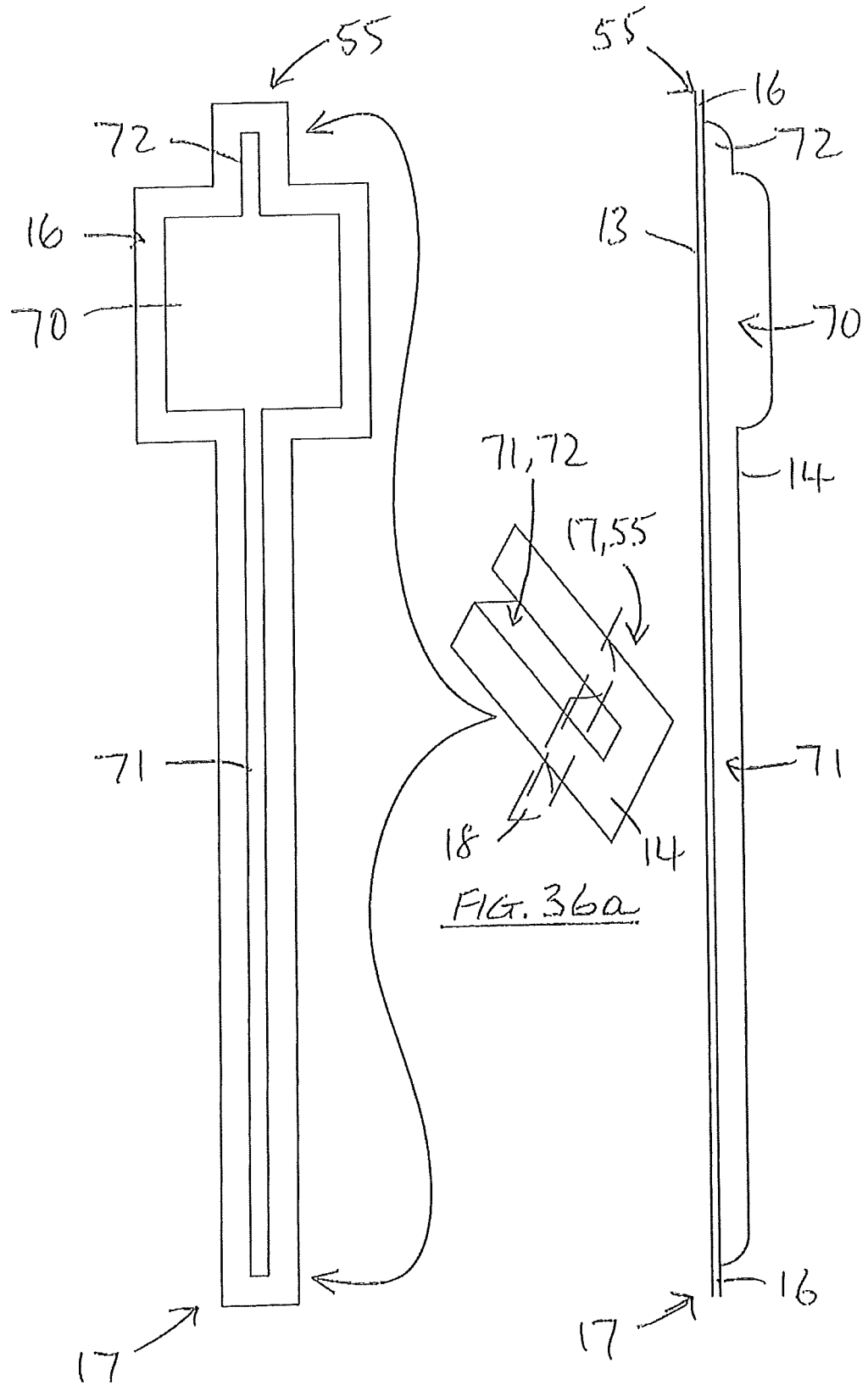

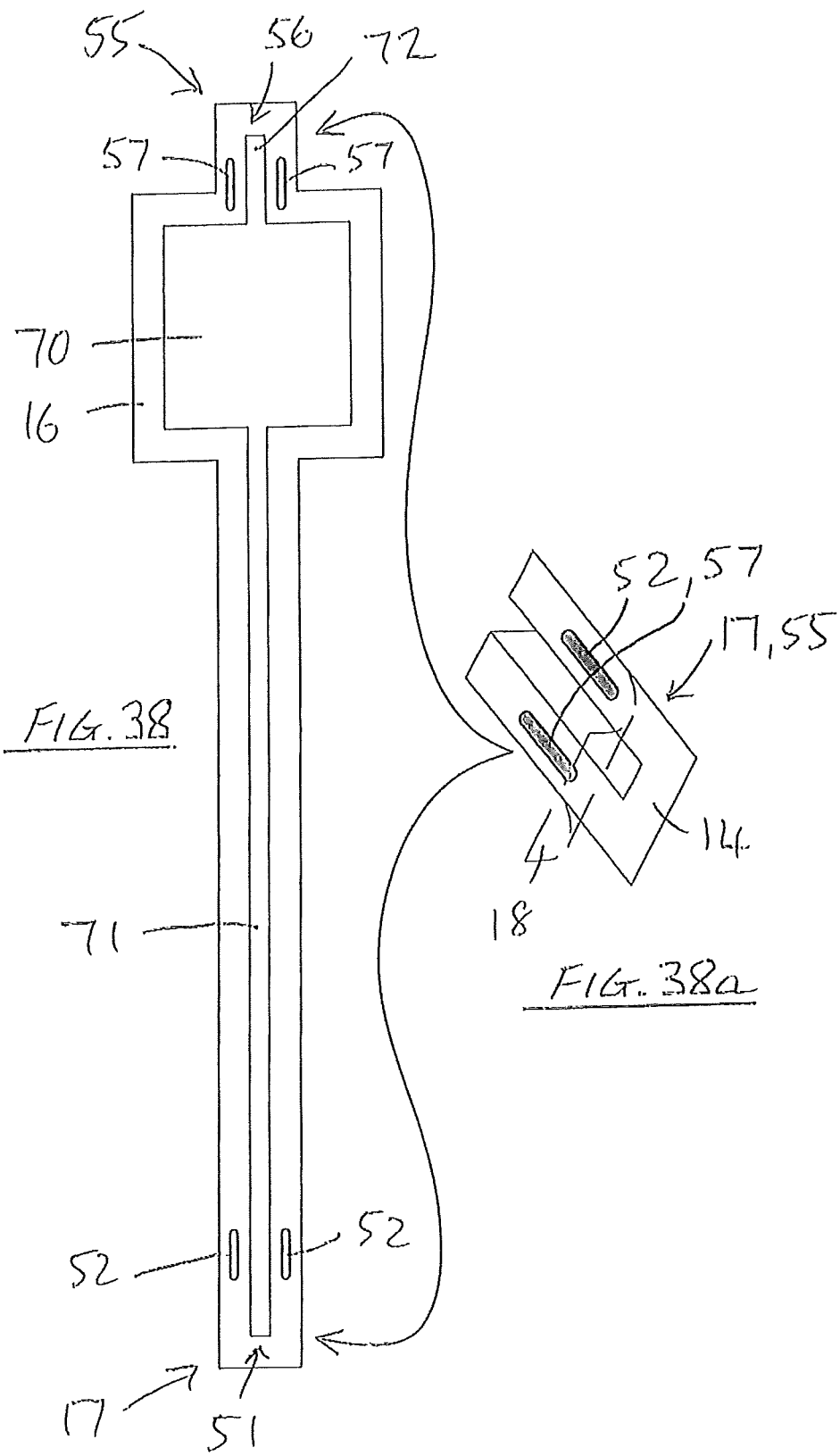

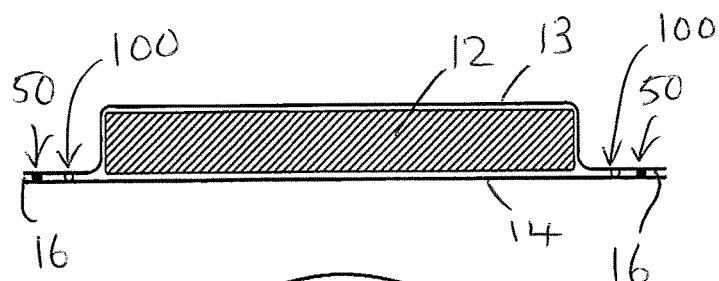
FIG. 43
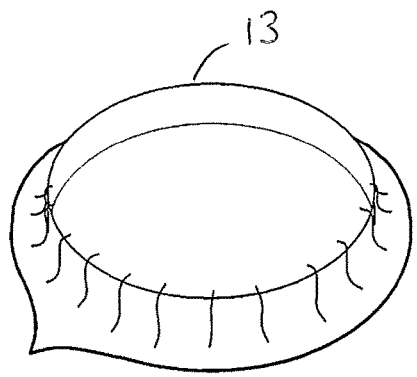
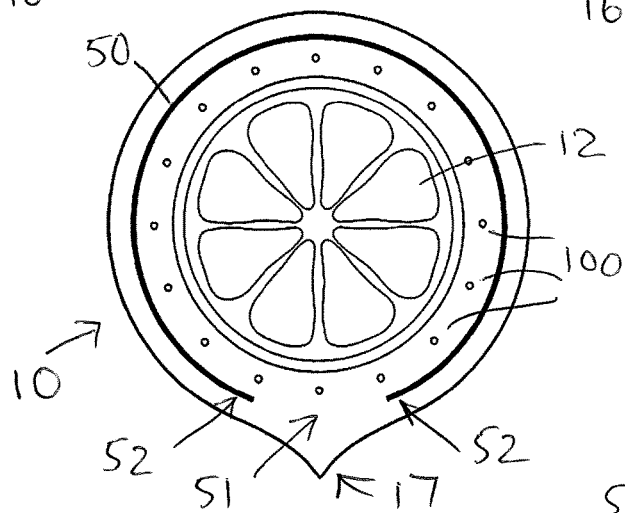
FIG. 42
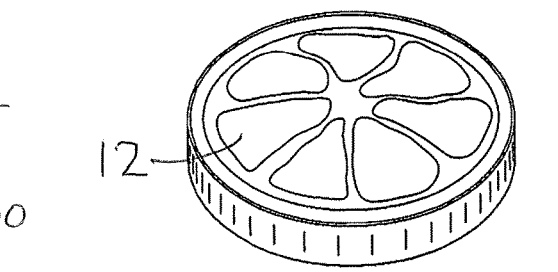
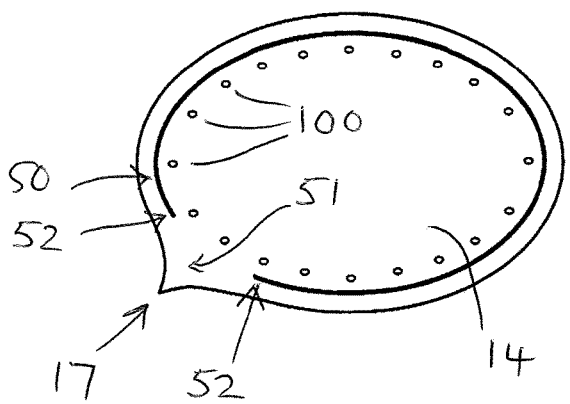
FIG. 41

SEALED PACKAGE CONTAINING A SQUEEZABLE PRODUCT

The present invention relates to a pack, and more particularly to a pack for dispensing a liquid.

Some fresh fruits are used in the food and drink industries for the juice held within the fruit. It is often desirable to squeeze the fruit in order to extract the juice from the fruit and direct the juice over food or into a drink. In kitchens and bars, therefore, it is common for fruit, such as citrus fruits (lemons, limes), to be sliced or cut ready for use. This can, however, lead to wastage if the slices are not used within an acceptable timeframe. Also, squeezing the slices can be messy in that residue is left on fingers and in that the direction of the juice being extracted is not always predictable. Additionally, sometimes it is desirable to use the fruit after juice has been extracted.

Furthermore, fruit production is generally seasonal and can be vulnerable to poor growing seasons as well as good growing seasons. Good seasons may lead to over-production of a particular fruit which can result in wastage and poor seasons may lead to shortages and/or increased prices. A more steady and predictable supply could be beneficial.

According to a first aspect of the present invention there is provided a pack comprising a sealed package containing a squeezable product, the package having a first openable portion and being at least partially flexible to enable squeezing of the product to facilitate dispensing of a liquid or particulate material emanating from the product via the first openable portion once opened, wherein the package comprises one or more films which are fluid-tight and which fully enclose a volume in which the product is sealingly retained, wherein said one or more films comprises a flexible first film and a second film, which films are sealingly joined to each other about a periphery thereby fully enclosing said volume in which the product is sealingly retained, wherein the first openable portion comprises at least one of the films having a grippable tab which can be manipulated to peel apart the joint between the films, the connection between the films being weaker in the region of the first openable portion compared to the connection on either side of the openable portion thereby resisting separation of the films beyond a predetermined amount.

Preferred features of the present invention are set out in the sub-claims attached hereto.

According to another aspect of the present invention there is provided a pack comprising a sealed package containing a squeezable product, the package having a first openable portion and being at least partially flexible to enable squeezing of the package to facilitate dispensing of a liquid or particulate material emanating from the product via the first openable portion once opened, wherein the pack has at least one formation for improving the dispensing of the liquid or particulate material and wherein the package comprises one or more films which are fluid-tight and which fully enclose a volume in which the product is sealingly retained.

In some embodiments said one or more films comprises a flexible first film and a second film, which films are sealingly joined to each other about a periphery thereby fully enclosing said volume in which the product is sealingly retained and usually said one or more films are made from food-grade plastics materials and are secured to each other about said periphery by one of, or a combination of, heat sealing or welding or adhesive or folds. With some arrangements the first and second films are constituted by a single folded film, the fold constituting part of said periphery. Often the second film is flexible but may well be less flexible than the first film and in some but not all embodiments the second film is sufficiently rigid and therefore has sufficient structural integrity to hold the shape of a formation formed in or on the film.

In preferred arrangements the first openable portion comprises at least one of the films having a grippable tab which can be manipulated to break the joint between the films at a predetermined location and ideally the joint between the films has different strengths along said periphery. With some embodiments the joint includes a first seal portion in the region of the first openable portion which is relatively weak compared to second seal portions on each side of the first seal portion, whereby the stronger second seal portions resist separation of the films beyond a predetermined amount so as to limit the first openable portion to a size which prevents removal of the product and often the two second seal portions constitute a unitary second seal extending around the periphery except for the first seal portion.

With further preferred arrangements the package has a second openable portion at a position spaced from the first openable portion, the second openable portion comprising at least one of the films having a further grippable tab which can be manipulated to break the joint between the films at a second predetermined location. With some of these embodiments the joint between the films has a third seal portion in the region of the second openable portion which is relatively weak compared to fourth seal portions on each side of the third seal portion, whereby the stronger fourth seal portions resist separation of the films beyond a second predetermined amount which is greater than said first predetermined amount so as to limit the size of the second openable portion. Sometimes each of the second seal portions is contiguous with a respective one of the fourth seal portions and the first openable portion is opposite the second openable portion.

In one preferred type of construction said at least one formation comprises the second film being more rigid than the first film and being provided with a preformed fold line across at least part of the volume enclosed by the package. Ideally, the product is substantially disc shaped and the preformed fold line extends at least partly across a diameter of the package and terminates at one end in the region of the first openable portion.

In some constructions said at least one formation comprises an insert plate which lies against one of the films and is less flexible than said film. The insert plate can be provided on the exterior of the package but more usually the insert plate is provided internally within the volume of the package and is disposed between one of the films and the product. The insert plate can be secured to an inside face of said one film. It is a preferred but optional feature that the insert plate has a number of projections which project towards the product.

It is also possible that said at least one formation comprises at least one of said one or more films being provided with a number of projections which project towards the product.

With some constructions said at least one formation comprises one or more upstanding walls provided internally of the volume and adjacent the said first openable portion between the product and said first openable portion. Often said wall or walls are upstanding from and are attached to the second film which is less flexible than the first film.

Said at least one formation may comprise an internally projecting first ridge provided on the first film and an oppositely disposed, internally projecting second ridge provided on the second film, the two ridges being shaped and sized so as to nest one within the other when the two films are moved towards each other. Usually the two ridges are part-circular and are not provided in the region of the first openable portion.

In certain embodiments said at least one formation comprises at least one channel formed in the second film and having an open face disposed towards said product and extending to the region of said first openable portion. Preferably said at least one channel comprises an elongate main section and a number of additional feeder channels extending therefrom and facing different areas of the product. Alternatively more than one elongate channel is provided and one or more channels terminates closer to the first openable portion than the others such that increased opening of the first openable portion reveals the ends of more channels and conveniently there is an elongate central channel with adjacent elongate side channels, each side channel having additional feeder channels extending therefrom and facing towards different areas of the product. Often the central and side channels terminate at different distances from the first openable portion.

It is also possible that the product is a disc-shaped slice of fruit having an outer rind portion and an inner flesh portion incorporating said liquid, said at least one formation comprising at least one cut through the rind portion to the flesh portion to facilitate folding the slice. In these arrangements said at least one cut is in the form of a V-shaped notch, the apex of the V-shaped notch extending into the flesh portion of the slice and it can be beneficial that two cuts are provided at diametrically opposite positions, one of the cuts being located adjacent said first openable portion.

A further possible feature is that said at least one formation comprises an extended tongue projecting from the second film adjacent the first openable portion, the tongue being formed with a depression for collecting liquid or particulate material dispensed after opening the pack.

In some arrangements the volume has a main volume and an elongate secondary volume extending therefrom and communicating therewith, the first openable portion being provided at the end of the secondary volume remote from the main volume. Preferably an elongate tertiary volume extends from the main volume and in communication therewith, a second openable portion being provided at the end of the tertiary volume remote from the main volume and usually the secondary and tertiary volumes extend in opposite directions from the main volume. Ideally in these embodiments the or each openable portion comprises at least one of the two films having a grippable tab which can be manipulated to break the joint between the films and further, the sealed joint between the films is weaker in the region of the or each openable portion compared to the sealed joint on either side of the openable portion, thereby resisting separation of the films beyond a predetermined amount.

It is also envisaged that the package comprises a single film folded over about a fold and secured to itself about a sealed edge which terminates at the fold to define a fully enclosed volume. Preferably said first elongate openable portion comprises the film having at least one grippable tab which can be manipulated to break the sealed joint between the films and, in addition, at said first openable portion the sealed edge between the films immediately adjacent the fold is weaker than an adjacent part of the sealed edge to resist separation of the film beyond a predetermined amount so as to limit the first openable portion to a size which prevents removal of the product. Often a second openable portion is provided immediately adjacent the fold at the other end of the sealed edge and also the second openable portion comprises the film having at least one further grippable tab which can be manipulated to break the sealed joint between the films. Preferably at said second openable portion the sealed edge between the films immediately adjacent the fold line is weaker than an adjacent part of the sealed edge to resist separation of the film beyond a second predetermined amount which is greater than said first predetermined amount so as to limit the size of the second openable portion. In these embodiments the product may be a semi-circular disc-shaped slice of fruit, the diameter being adjacent the fold.

In all of these embodiments, one or more additional substances may be included in the volume prior to sealing of the pack. The one or more additional substance may comprise a fruit juice. This additional substance may be added in order to achieve a standard contents weight or to include any additional component/flavour/ingredient.

The invention is not restricted to the products being in the form of a piece of fruit in which the liquid is constituted by the juice of the fruit. In other embodiments the product may be an absorbent substrate containing a cosmetic or pharmaceutical liquid.

According to another aspect of the present invention there is provided a pack comprising a sealed package which holds therein a liquid, the package having a first openable portion to enable the package to dispense the liquid from the package, wherein the package comprises one or more films which are fluid tight and which fully enclose a volume in which the liquid is sealingly retained, wherein the volume has a main volume and an elongate secondary volume extending therefrom and communicating therewith, the first openable portion being provided at the end of the secondary volume remote from the main volume.

Preferably a second openable portion is provided to act as a vent to facilitate dispensing of the liquid through the first openable portion. Often, an elongate tertiary volume extends from the main volume and in communication therewith, the second openable portion being provided at the end of the tertiary volume remote from the main volume and ideally the secondary and tertiary volumes extend in opposite directions from the main volume. Usually the or each openable portion comprises at least one of the two films having a grippable tab which can be manipulated to break the joint between the films. Conveniently the sealed joint between the films is weaker in the region of the or each openable portion compared to the sealed joint on either side of the openable portion, thereby resisting separation of the films beyond a predetermined amount.

Often said one or more films comprises a flexible first film and a second film, which films are sealingly joined to each other about a periphery thereby fully enclosing said volume in which the product is sealingly retained, whereby the package can be squeezed to facilitate dispensing of the liquid via said first openable portion. Ideally the second film is sufficiently rigid to maintain its shape during and after dispensing of the liquid.

Conveniently said one or more films are made from food-grade plastics materials and are secured to each other about said periphery by one of, or a combination of, heat sealing or welding or adhesive or folds.

According to another aspect of the present invention there is provided a pack comprising a sealed package which holds therein a liquid, the package having a first openable portion to enable the package to dispense the liquid from the package, wherein the package comprises one or more films which are fluid tight and which fully enclose a volume in which the liquid is sealingly retained, wherein one of the films has an extended tongue projecting therefrom adjacent the first openable portion, the tongue being formed with a depression for collecting liquid dispensed after opening the pack.

In some arrangements, the package includes an absorbent product containing said liquid and is at least partially flexible to enable squeezing of the absorbent product to facilitate dispensing of the liquid. Examples of suitable liquids are cosmetic compounds such as moisturising creams or serums or pharmaceutical compounds such as medicines or ointments. In other arrangements, the product is a friable product which, when crushed, produces an amount of said particulate material.

According to another aspect of the present invention there is provided a pack comprising a sealed package which holds therein a liquid, the package having a first openable portion to enable the package to dispense the liquid from the package, wherein the package comprises first and second films which are fluid tight and which fully enclose a volume in which the liquid is retained, wherein said films are sealingly joined to each other about a periphery thereby fully enclosing said volume, the joint including a first seal portion in the region of the first openable portion which first seal portion is relatively weak compared to second seal portions on each side of the first seal portion, whereby at the first openable portion the stronger second seal portions resist separation of the films beyond a predetermined amount so as to limit the size of the first openable portion.

In this type of arrangement the first openable portion may comprise at least one of the films having a grippable tab which can be manipulated to break the joint between the films. Also the two films may be constituted by a single folded film with the fold constituting part of the sealed joint enclosing said volume. Furthermore, a second openable portion can be provided remote from first openable portion and having a similar type of opening arrangement, including a size limited opening as described earlier.

Figure 24:
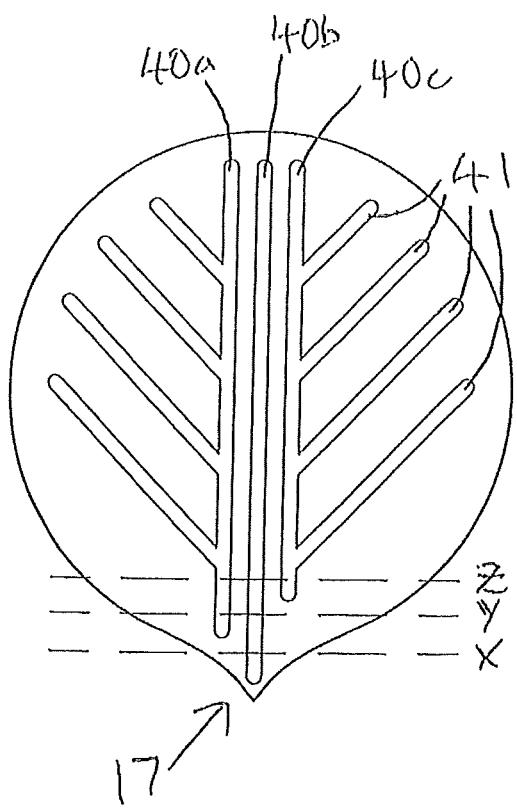
Figure 23:
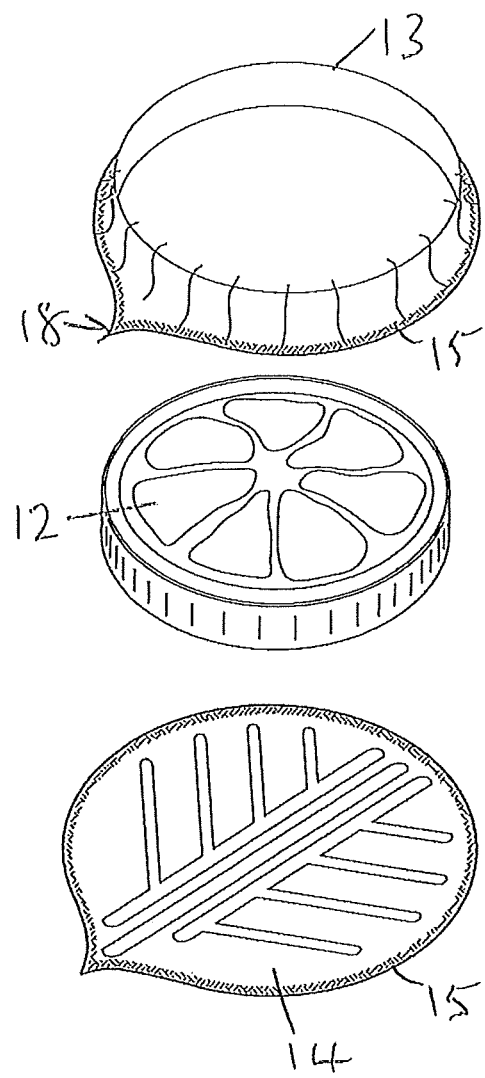
Figure 25:
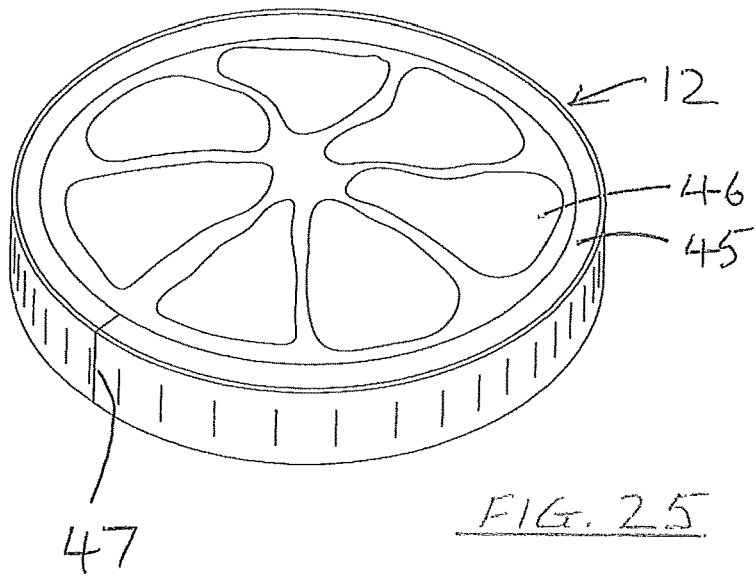
Figure 25A:
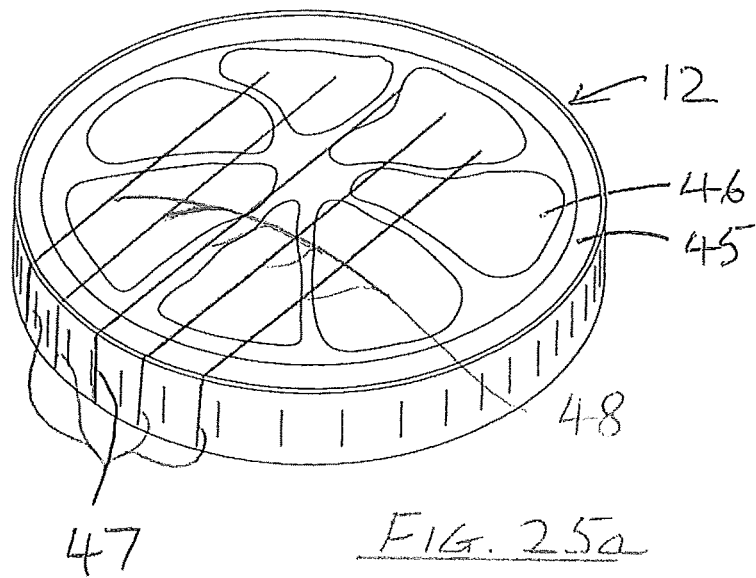
Figure 26:
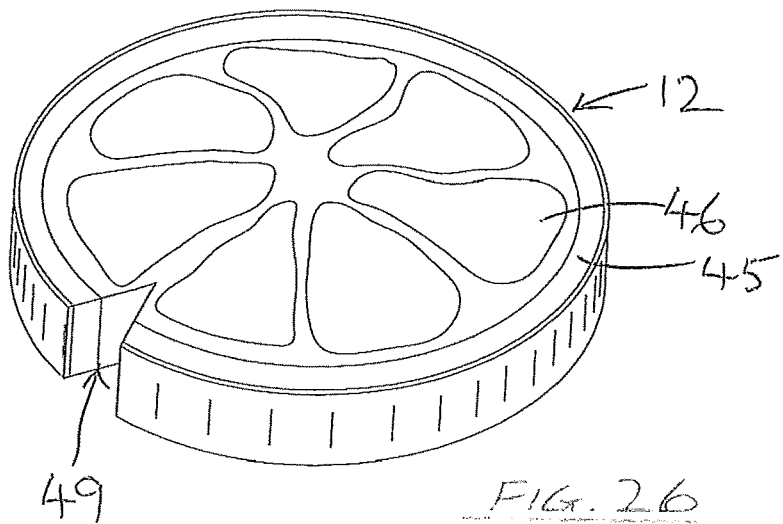
Figure 39A:
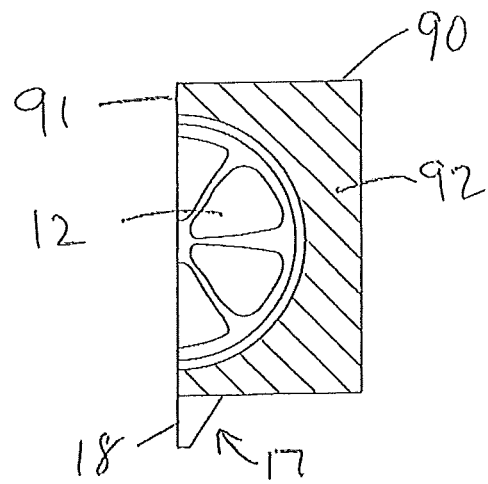
Figure 39B:
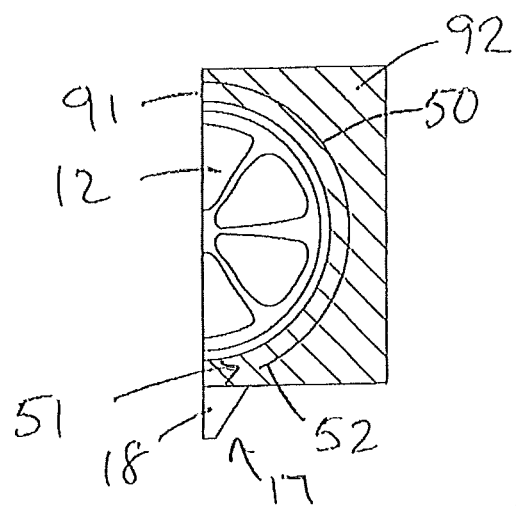
Figure 39C:
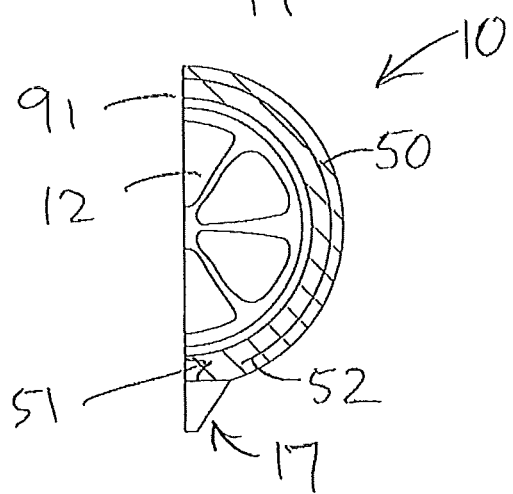
Figure 40A:
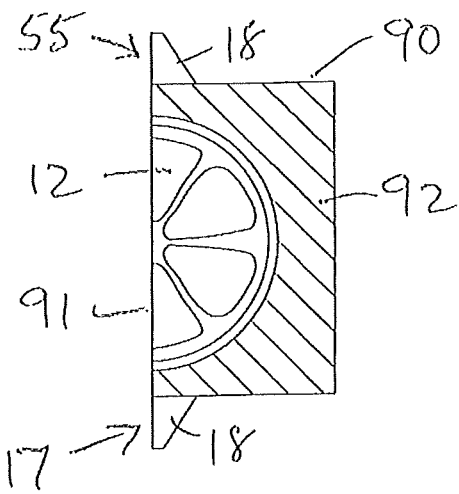
Figure 40B:
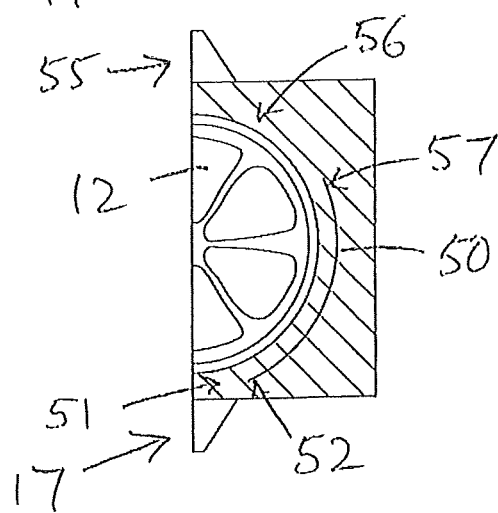
Figure 40C:
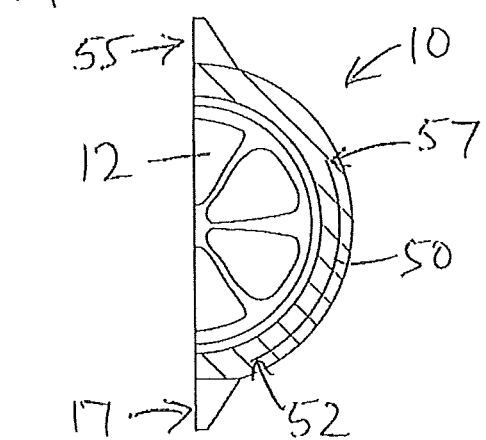

Embodiments will be described in more detail. The description makes reference to the accompanying diagrammatic drawings in which:

FIG. 1 is an exploded view of a pack containing a product which holds therein a liquid, FIG. 2 is a plan view of the product of FIG. 1, FIG. 3 is a lateral section through the pack of FIG. 2, FIG. 3a is an end view of another pack similar to FIGS. 1 to 3, FIG. 3b is a side view of the pack of FIG. 3a resting on a support surface, FIG. 4 is an exploded view similar to FIG. 1 of another pack similar to FIG. 1, FIG. 5 is a plan view of the pack of FIG. 4, FIG. 6 is a lateral section through the pack of FIG. 5, FIG. 7 is an exploded view of another pack, FIG. 8 is a plan view of the pack of FIG. 7, FIG. 9 is a lateral section through the pack of FIG. 8, FIG. 10 is a perspective view of the pack of FIGS. 7 to 9 in use, FIG. 11 is an exploded view of a further pack, FIG. 12 is a lateral section through the assembled pack of FIG. 11, FIG. 13 is an exploded view of another pack, FIG. 14 is a plan view of the pack of FIG. 13, FIG. 15a is a schematic end view of the pack of FIG. 14 and FIG. 15b is a longitudinal section through the pack of FIG. 14, FIG. 16 is an exploded view of a still further pack, FIG. 17 is a plan view of the pack of FIG. 16, FIG. 18 is a lateral section through the pack of FIG. 17, FIG. 19 is an exploded view of another further pack, FIG. 20 is a plan view of the pack of FIG. 19, FIGS. 21a and 21b are lateral and longitudinal sections through the pack of FIG. 20, FIG. 22 is an exploded view of a still further pack, FIG. 23 is an exploded view of a further pack, FIG. 24 is a schematic plan view of part of the pack of FIG. 23 pack during an opening process, FIG. 25 is a perspective view of a slice of fruit for use in the present invention, FIG. 25a is a perspective view of an alternative slice of fruit for use in the present invention, FIG. 26 is a perspective view of another slice of fruit for use in the present invention, FIG. 27 is a schematic exploded view of a pack according to the present invention, FIG. 28 is a schematic plan view of the pack of FIG. 27, FIG. 29 is a lateral section through the pack of FIG. 28, FIG. 30 is a schematic exploded view of a further pack according to the present invention, FIG. 31 is a schematic plan view of the pack of FIG. 30, FIG. 32 is an exploded view of another pack, FIG. 33 is a plan view of the pack of FIG. 32, FIG. 34 is a longitudinal section through the pack of FIG. 33, FIG. 35 is a schematic plan view of a version of the pack shown in FIGS. 32 to 34 and according to the present invention, FIG. 36 is a plan view of another type of pack, FIG. 36a is a perspective detail of FIG. 36, FIG. 37 is a schematic longitudinal section through the pack of FIG. 36, FIG. 38 is a plan view of a modified embodiment of the pack of FIG. 36, FIG. 38a is a perspective detail of FIG. 38, FIGS. 39a to 39c are illustrative side views through a sequence of manufacturing steps of another pack according to the present invention, FIGS. 40a to 40c are illustrative side views through a sequence of manufacturing steps of a further pack according to the present invention, and FIGS. 41 to 43 are similar to FIGS. 27 to 29 and illustrate a further feature of the present invention, In the various embodiments of a pack described below, many features are shared by the embodiments and so like features have been given like reference numerals. Similarly, some embodiments can be readily combined such that an end product may incorporate two or more of the features which are described individually below, thereby compounding the advantages provided.

In FIGS. 1 to 3, there is disclosed a basic pack 10 comprising a sealed package 11 in which is sealingly retained a product 12 containing a liquid. In the embodiment shown, the product 12 is in the form of a slice of lemon or other citrus fruit and the sealed package 11 is formed from two fluid-tight films 13, 14. In this arrangement, the first film 13 is a flexible food-grade plastic film and the second film 14 is a more rigid food-grade plastic film, both films being made from appropriate materials known in the food industry. In other arrangements, one or both films could be made from other liquid impervious materials such as plastic-coated board/paper.

In FIG. 1, the markings 15 around a periphery of each of the films 13, 14 indicate where the two films are sealingly joined together so as to fully enclose the product 12 within an enclosed volume during manufacture of the pack 10 (similar markings are not actually shown on all figures although the sealed joint is still a feature of the other embodiments). The sealed joint 16 between the two films 13, 14 is formed in one of a number of ways such as heat sealing, welding, adhesive or using a combination of these, and the process may involve shrink-wrapping or connection of pre-moulded film members. The continuous sealed joint 16 may be wider than as illustrated and may vary in width along its continuous length. It is also envisaged, and is discussed in respect of later embodiments, that a fold in a single folded film can constitute part of the peripheral seal encapsulating the product 12.

It will be appreciated that if the liquid contained in the product is not a foodstuff then the films 13, 14 need not be made of a food-grade material. The product 12 can be an absorbent substrate containing a liquid.

Furthermore, the relative flexibility of the films 13, 14 is not always important. In some embodiments described herein the second film 14 is relatively rigid compared to the first film 13, usually so that the second film 14 has sufficient structure integrity to retain a particular shape or formation formed therein or thereon. However, in some embodiments, both films 13, 14 could be highly flexible and not suited to retaining a shape or formation.

The package 11 shown in FIG. 1 is generally circular as shown in FIG. 2 but has a first openable portion 17 at one location on its periphery. In the embodiments shown, the first openable portion 17 is in the form of an easy-peel opening which is known in the packaging industry. Usually, this will comprise one or both of the films 13, 14 having a grippable tab 18 which can be manipulated so as to break or peel apart the sealed joint 16 by separating the films 13, 14 at the first openable portion such that the enclosed volume of the package communicates with the exterior. This enables the liquid contained in volume to be dispensed through the opening created in the sealed joint 16.

Suitable choice of films 13,14 and sealing method for securing the films in the region of the first openable portion 17 can result in the openable portion 17 being re-closable after opening such that the package can be stored, perhaps in a refrigerator, and used again to dispense any liquid that may remain in the package. Resealed joints may not be as strong as the original sealed joint but may be sufficient to prevent leakage between first and subsequent uses of the pack to dispense the liquid. After the initial seal is opened, one or both films retain a degree of tackiness for re-closing the pack sufficiently to prevent leakage during storage after opening, even when the seal area is wet as the result of the dispensing of some of the liquid.

The flexibility of at least parts of the package 11 enables the package to be squeezed and manipulated to extract the liquid from the product 12. The opening created in the sealed joint 16 enables the liquid to be dispensed in a controlled direction and the fluid-tight films 13, 14 help to ensure that the liquid does not get onto the hand/fingers of the user. As mentioned previously, this is of particular benefit with lemons and other citrus fruits when used in the cooking/restaurant/drinks industries, not only from the convenience and cleanliness points of view but also from a health point of view to reduce the possibility of juice contact for people susceptible to skin conditions such as phytophotodermatitis.

It will be readily appreciated that the actual shape of the pack 10 is not limited to those shown in the illustrative embodiments. The packs 10 can be of any suitable shape so as to provide a sealed volume containing a liquid containing product of any shape. Similarly, any number of films can be utilised to form the pack provided a sealed enclosure is formed around a volume containing the product. One or more of the films can even be a rigid sheet or incorporate rigid sections in certain embodiments. In the illustrations, the films are shown as being transparent in order to aid understanding but this need not be the case.

FIGS. 3a and 3b illustrate an optional modification of the pack 10 shown in FIGS. 1 to 3. In the modified embodiment, the second film 14 has an externally projecting foot 19 located in the region of the first openable portion 17 and projecting away from the pack. The foot 19 may be integrally formed with or subsequently attached to the second film 14. The foot 19 enables the pack 10 to sit on a support surface (FIG. 3b), such as a table or worktop, at an angle so that the first openable portion 17 is elevated relative to other parts of the pack. This is illustrated in FIG. 3b and this arrangement is advantageous to prevent leakage from a pack that has been opened at the first openable portion 17 but which still contains liquid. The foot 19 is shown with a flat lower edge 19a to aid stability but a pair of spaced feet 19 on either side of the first openable portion 17 could also be provided to aid stability instead of the central foot shown. Such a foot or feet could be utilized in conjunction with any of the embodiments illustrated in the figures.

In FIGS. 4 to 6, the pack 10 has the same features of the pack shown in FIGS. 1 to 3 except that the second film 14 has a pre-formed fold 20. In the illustrations, the fold 20 extends fully across a diameter of the second film 14 from the first openable portion 17, although it is possible that fold 20 could extend only across a portion of the second film 14 and, indeed, more than one pre-formed fold could be provided in the second film.

The diametrical fold 20, as illustrated, is particularly advantageous when the product 12 is a slice of fruit such as a lemon because it assists in the folding of the package in order to maximise the squeezing of the fruit and maximise the juice extraction once the first openable portion 17 has been opened. The orientation of the fold 20 also tends to direct and channel the extracted juice towards the first openable portion 17 when the fruit has been folded. The fold 20 also assists in the directing of the liquid on exiting the pack.

FIGS. 7 to 10 show an embodiment in which the pack 10 incorporates an insert plate or disc 25 between the product 12 and the first film. The disc 25 gives the pack 10 an additional degree of rigidity which is particularly useful when the product is being squeezed, as illustrated more clearly in FIG. 10. The pressure applied by, for example, a finger 26 or a thumb of the user can be manipulated in various directions so as to increase the extraction of liquid from the product such as a lemon slice. This squeezing action can be applied before or after opening of the first openable portion 17, FIG. 10 showing the first openable portion still in a closed configuration. The disc 25 also provides some additional support to reduce possible damage to the pack/product during transportation and storage/stacking.

The actual shape, size and rigidity of the disc 25 is a matter of design choice. Also, if both films 13, 14 are particularly flexible, a disc could be provided on both sides of the product 12 between the respective films 13, 14 and the product 12.

Furthermore, the or each disc 25 could be secured to the inside surface of its associated film 13, 14 by means of heat welding or adhesive for example or may be unsecured between the inside surface of the film 13, 14 and the product 12. Securing the disc 25 gives an improved squeezing action and retains the disc 25 in an optimum position relative to the product 12 during squeezing and during transportation and storage. In other embodiments, not illustrated, the disc 25 could be secured to the outside of the film 13, 14 and still have a beneficial effect on the liquid extraction from the product.

FIGS. 7, 8 and 10 also show an optional additional feature in the form of a linear pre-fold or crease 25a which extends across the width of the disc 25. The pre-fold 25a, if provided, could extend fully or partly across the width of the disc 25. The pre-fold 25a assists in the folding of the pack 10, and hence the folding of the product 12, to aid the liquid extraction process in addition to the squeezing/manipulating action described earlier. It is envisaged that the pre-fold 25a extends from the end of the disc 25 nearest the first openable portion 17 to a diametrically opposite point, but other orientations of the pre-fold are possible, such as perpendicular to the orientation just stated.

It is also envisaged that, where provided, the pre-fold 25a could be aligned above a fold 20 provided in the second film 14 as discussed above in respect of FIGS. 4 to 6, thereby further assisting the process of folding the product 12 to aid liquid extraction. Furthermore the pre-fold 25a, depending on the material of the disc 25, could be pre-disposed or biased so as to be easier to fold the two halves of the disc 25 towards each other in one direction than the other. In these embodiments it is envisaged that the bias of the pre-fold 25a is such that it is easier to fold the pack 10 in a way that the second film 14 is outside and the folded disc 25a is inside the folded pack.

FIGS. 11 and 12 illustrate an embodiment similar to that shown in FIGS. 7 to 10 in that there is an insert plate or disc 25 provided between the first film 13 and the product 12. In this embodiment, the disc 25 is provided with a number of projections 28 which extend towards the product 12 as illustrated more clearly in FIG. 12. The projections 28 assist in the process of extracting the liquid from the product 12. In particular, with fruits such as lemon, the projections 28 aid in the rupturing of the juice-containing sacs within the flesh of the fruit thereby increasing the amount of juice that can be extracted from the fruit.

FIGS. 11 and 12 also show the second film 14 being formed with a number of similar projections 29 which also extend towards the product 12. Such projections 29 are generally only possible in arrangements in which the material of the second film 14 is sufficiently rigid to maintain a shape. However, it is possible that a highly flexible film could still be formed with such projections 29 and these would still have a beneficial effect during the squeezing/juice extraction process. Either one of flexible films 13, 14 could be pre-formed with such projections 28, 29. Similarly, a second disc 25 with projections 28 could be provided between the second film 14 and the product 12. Again, the disc or discs 25 could be secured to the film or be provided loose between the product and the film.

It is also noted that either or both of the folds 20 or 25a described above could also be utilised in the arrangements shown and described with reference to FIGS. 11 and 12.

The arrangement shown in FIGS. 13 to 15 is particularly useful in packs 10 in which the product is a fruit containing pips, such as a citrus fruit, or where there is other unwanted solid matter. In this arrangement, the second film is provided with an upstanding wall 30 which is disposed within the volume enclosed by the two films 13, 14. In the embodiment shown, the wall 30 is provided between the first openable portion 17 and the product 10. Once the first openable portion 17 is opened to enable the liquid to be dispensed from the pack, the wall 30 acts to prevent any pips or solid matter from being dispensed through the first openable portion 17 or from blocking the first openable portion 17.

In other similar arrangements, not illustrated, a number of spaced walls 30 could be provided at least in the region of the first openable portion at spaced locations around the periphery of the product, whereby the walls 30 block unwanted solids and gaps between the walls 30 allow the liquid to flow through to the first openable portion 17.

The wall 30 or walls would usually be secured to or integrally formed with the second (or least flexible) film 14 but it is also possible that the wall or walls 30 could be provided by a separate component inserted in the pack between the product 12 and the films during manufacture.

In FIGS. 16 to 18, there is shown a pack in which there are part-circular ridges 35, 36 extending from the films 13, 14 towards the product 12, the relative sizes of the ridges 35 being such that one nests within the other when the two films 13, 14 are squeezed towards each other. The ridges aid juice extraction when squeezed together and/or when the films 13, 14 are manipulated in lateral directions relative to each other.

In the arrangement shown, the ridges 35, 36 are part-circular because the general shape of a lemon slice is circular and are sized so as to engage the flesh of the lemon slice inside the rind/pith section of the fruit. Other shapes or arrangements of nesting ridges would be possible and are a matter of design choice. Also, the illustrated ridges 35, 36 are shown without a ridge portion in the region of the first openable portion 17 so as to enable a clearer path for juice to flow from the pack during use. Again, the ridges could be formed integrally with the films or could be provided as a separate component or components.

In FIGS. 19 to 21 there is shown a pack 10 embodiment in which the second film 14 has sufficient structural integrity to have a channel 40 formed therein, the open face of the channel facing towards the product 12. The precise dimensions, cross-sectional shape, overall shape and length of the channel 40, is a matter of design choice. In the illustration, the channel 40 is straight and extends partway along a diameter of the product 12, terminating adjacent the first openable portion 17. It will be appreciated that the ends of the channel 40 are located within the peripheral sealed joint 16 of the pack 10 such that the enclosed volume of the pack remains fluid-tight. The channel 40 improves the flow of liquid towards the first openable portion 17 and hence improves dispensing of the liquid.

FIG. 21b illustrates the opening of the first openable portion 17 with the grippable tab 18 of the first film 13 being peeled away from the second film to expose the open face of the end of the channel 40. This, of course, enables the liquid/juice to be dispensed from the pack. In fact, FIG. 21b serves to illustrate the opening of the first openable portion of other illustrated packs, save for the inclusion of the channel 40, although the operation of peel apart seals is known in the food packaging industry and packaging industry in general.

FIG. 19 (but not FIG. 20, 21a or 21b) also shows an optional additional feature in the form of a linear pre-fold or crease 20a in the second film 14 and extending between the end of the channel 40 remote from the first openable portion 17 and the edge of the second film 14. The pre-fold 20a acts in a similar manner to fold 20 described above in connection with FIGS. 4 to 6, assisting in the folding of the pack to maximise the squeezing of the product 12 and thereby maximising the liquid extraction. It is also envisaged that a similar optional pre-fold or crease 20a could be provided between the first openable portion 17 and the end of the channel 40 adjacent the first openable portion, either in addition to or instead of the pre-fold 20a at the remote end of the channel 40.

FIG. 22 illustrates a modified form of the embodiment shown in FIGS. 19 to 21. In the embodiment shown in FIG. 22, there is a main channel 40, extending diametrally in this case, and also a number of additional feeder channels 41 which extend from the main channel. The feeder channels 41 also have their open faces directed towards the product 12 and are directed to different areas of the product 12. This improves the flow of liquid towards the first openable portion 17 and improves the dispensing of the liquid. The size, shape and number of feeder channels 41 is a matter of design choice but an even distribution of channels across the area of the product is preferable.

FIGS. 23 and 24 illustrate a further embodiment incorporating channels 40, 41 in the second film 14. In this arrangement, there are three main channels 40a, 40b and 40c which terminate at different distances from the first openable portion 17, as illustrated more clearly in FIG. 24. When peeling back the grippable tab 18 (not shown) in order to open the first openable portion 17, the user can peel back the tab 18 a first amount (X) to reveal the end of only the middle channel 40b, a bit further (Y) to reveal also the end of the left side channel 40a and a bit further still (Z) to reveal also the end of the right side channel 40c. In this way, the user can control the rate of flow of liquid from the pack, the greater the number of channels being exposed resulting in a greater rate of flow of liquid from the pack.

It will be appreciated that different numbers of main/side channels could be provided, with or without all or some of the feeder channels 41. It will also be appreciated that a similar pre-fold or pre-folds 20a as described above could also be utilised in the arrangements shown and described with reference to FIGS. 22 to 24.

In FIG. 25 there is shown a product 12 in the form of a slice of fruit, such as a lemon. The slice of lemon has an outer rind/pith portion 45 and an inner flesh portion 46, the flesh portion 46 containing the liquid in the form of the juice of the fruit which is intended to be dispensed from the pack 10, such as the basic pack 10 shown in FIGS. 1 to 3. The product 12 is provided with a formation for improving the dispensing of the liquid, the formation being in the form of one or more cuts 47 through the rind/pith of the fruit to the flesh and across the thickness of the disc from a top surface of the fruit to a bottom surface. In FIG. 25, the cut 47 is provided at one location on the generally circular circumference of the product and this cut facilitates the folding of the slice in order to improve juice extraction during the squeezing process.

It has been found that it is best if the cut 47 is provided adjacent the first openable portion 17 such that the folding of the slice of fruit is initiated and occurs along a diagonal extending from the region of the first openable portion 17. A further cut 47 provided on the opposite side of the slice of fruit has been found to improve further the folding of the fruit.

FIG. 26 is similar to FIG. 25 but provides a cut 49 in the shape of a V-shaped notch. Again, further improved performance would be exhibited if a second opposite cut 49 was provided or even a simple cut 47 opposite the V-shaped cut 49 was provided. Other cut shapes and further cut locations could, however, be envisaged to improve juice extraction.

In FIG. 25a, which is similar in many respects to FIG. 25, there is shown another product 12 in the form of a slice of fruit such as a lemon. In addition to the single cut 47 as discussed above with reference to FIG. 25, the product 12 has additional cuts 47 through the rind 45 at spaced locations along the rind, the number of cuts being open to choice. Furthermore, FIG. 25a shows optional additional cuts 48 through the thickness of the flesh portion 46, although a single additional cut 48 could be provided when there is a single cut 47 in the rind 45. These additional cuts 48 are shown in FIG. 25a as being extensions of the cuts 47, but this need not be the case. In addition, the additional cuts 48 are shown as extending generally parallel to each other across the majority of the width of the flesh portion 46, but this is just one envisaged arrangement and any number of cuts 48 could be provided in any direction and of any length. The additional cut or cuts 47, 48 assist in the folding/manipulation of the pack 10 and can improve the juice extraction process. The additional cut or cuts 48 can of course also be utilised with other shaped cuts 49 in the rind, such as those shown and described with reference to FIG. 26.

In an arrangement of the present invention as shown in FIGS. 27 to 29, the pack 10 is similar in most respects to that shown in FIGS. 1 to 3. In FIGS. 27 to 29, the markings 15 are not provided to indicate the peripheral seal between the two films 13, 14 but the peripheral seal is still present in this embodiment.

In addition to the standard peripheral seal, there is also provided a further connection between the two films 13, 14 around part of the periphery, as indicated by reference numeral 50. The further connection 50 can take a number of forms. The heat seal/weld or adhesive may simply be made stronger in the region 50 compared to the basic sealed joint of the FIGS. 1 to 3 embodiment. Alternatively, there may be an additional joint in the connection 50 such as an adhesive connection in addition to a basic heat seal/weld extending around the entire periphery. It is, however, essential that the further connection 50 is not present in the region of the first openable portion.

The result is that the seal between the films 13, 14 in the region of the first openable portion, i.e. a first seal portion 51, is relatively weak compared to the portions of the seal on each side due to the stronger, further connection 50, i.e. second seal portions 52. When the pack 10 is to be opened by peeling one of the films 13, 14 from the other, the first seal portion opens under a given force but the opening process stops when the opening reaches the stronger second seal/connection portions. This, therefore, prevents the first openable portion from opening beyond a predetermined amount without excessive force being applied. Often, this predetermined amount will be such that the product 12 cannot be forced out of the first openable portion 17.

Although the stronger further connection 50, that is the second seal portions 52, are contiguous and extend all around the periphery except for the region of the first openable portion 17, a similar effect could also be achieved with two separate further connections 50 (second seal portions 52), one on either side of the first openable portion 17 (first seal portion 51).

In FIGS. 30 and 31, there is shown a modification of the arrangement shown in FIGS. 27 to 29. In FIGS. 30 and 31, there is provided a second openable portion 55 which in this embodiment is opposite the first openable portion 17. Again, the second openable portion 55 is in the form of an easy-peel opening in which one or both of the films 13, 14 has a grippable tab 18 which can be manipulated to break the sealed joint between the films 13, 14. As with the previous embodiment, the second openable portion 55 has the basic peripheral seal between the films, i.e. a third seal portion 56, and has the stronger, further connections 50 on each side, the fourth seal portions 57. The second seal portions 52 and fourth seal portions 57 may be spaced from the peripheral seal. The fourth seal portions 57 prevent the second openable portion 55 from opening beyond a second predetermined amount without excessive force being applied, which second predetermined amount in some arrangements being larger than the first opening such that the product can be removed from the pack. This feature enables the pack to dispense liquid through the first openable portion 17 and/or remove the entire product 12, less any liquid that may already have been dispensed through the first opening, through the second openable portion. There are, of course, instances when some juice is required from the fruit prior to then using the fruit slice itself.

In FIGS. 30 and 31 the product 12 is actually shown as being cut in half diametrically by cut line 70. The halving of the slice can make it easier to remove the slice via the second openable portion in two parts. This embodiment is, however, just as suitable for a complete slice, although the positioning of the fourth seal portions 57 may vary depending on the dimensions of the fruit pieces to be removed. Instead more than one cut 70 can be provided to divide the slice into more than two pieces.

The arrangement shown in FIGS. 32 to 34 is similar in many respects to FIGS. 1 to 3 except that the product 12 is not depicted as a slice of lemon. The product 12 could be a slice of fruit but is depicted more generally as a substrate, and preferably an absorbent substrate, in which the liquid is contained, the product effectively acting as a reservoir for the liquid. The liquid could still be an edible foodstuff or could be a cosmetic substance such as a cream or a serum or a pharmaceutical substance such as a liquid medicine. By way of example, the substrate may be a form substrate, for example a memory foam which returns resiliently to its original shape after removal of a compressive, squeezing force or a non-memory foam which remains collapsed after removal of a compressive, squeezing force. The latter can be advantageous in that it provides a clearer indication of how much liquid has been removed because the substrate can flatten out under the compressive force used to extract the liquid.

Again, the product 12 containing the liquid is retained in a sealed volume between two films 13, 14. The second film 14 has sufficient structural integrity to include a tongue 65 extending therefrom in the region of the first openable portion 17. The tongue 65 is formed with a depression 66 for collecting a quantity of liquid dispensed after opening the pack 10. It is also possible for this pack 10 to function without the substrate such that the sealed volume contains only liquid, although a more viscous liquid would render operation of the spoon-like depression 66 much easier than a readily flowing liquid.

Also, for hygiene purposes, the first film 13 could extend and seal over the depression 66 such that opening of the first openable portion 17 also involves the uncovering of the depression 66 prior to the dispensing of the liquid.

FIG. 35 shows a modification incorporating the further connection concept according to the present invention as discussed in relation to FIGS. 27 to 29 above such that opening of the first openable portion 17 involves breaking of a first seal portion 51. Further opening beyond a predetermined amount is prevented by the presence of the stronger second seal portions 52 on either side of the first seal portion 51. In certain arrangements, a further modification as illustrated in FIGS. 30 and 31 above could also be incorporated if required in order to provide a second openable portion to enable removal of the product 12.

The arrangements shown and described in FIGS. 7 to 10, FIGS. 11/12 and FIGS. 27 to 31 particularly, but also in other arrangements described above, are also readily suited to packs for friable products. Such friable products can easily be crushed or squeezed when in the package in order to produce an amount of particulate matter, such as crumbs or powder, which exhibit some fluid-like properties similar to those of a liquid in that the particulate matter can be dispensed from the package once opened by pouring through the first openable portion. Examples of such friable products are biscuits or honeycomb or some cosmetic or pharmaceutical substances.

When the arrangements of FIGS. 7 to 10 and FIGS. 11/12 are utilized with a friable product 12, it is envisaged that the insert plate or disc 25 should be firmly bonded/welded/secured to the inside surface of the first film 13 to ensure effective crumbling. It is also envisaged that a different pattern of projections 28, 29 may be utilized in the FIG. 11/12 arrangement for a friable product. In addition, the projections 28, 29 may be larger and/or more pointed in order to better effect the crumbling process. Also for friable products, the provision of a second openable portion 55 as illustrated in FIGS. 30/31 for example could enable removal of the product 12 whole or partly whole.

It will be appreciated that in the arrangements described, the packs exhibit one or more formations which may improve the dispensing process by improving the extraction of liquid or the production of particulate material from the product or improving the flow of liquid or particulate matter within the product prior to and during dispensing or otherwise improving the dispensing process, according to the present invention as claimed.

FIGS. 36 to 37 show an alternative pack configuration which still incorporates some of the basic features discussed above. The pack 10 has first and second films 13, 14 which are sealed around their periphery to sealingly enclose a volume in which a liquid is retained. The volume may incorporate a substrate, either as an absorbent substrate or as a slice of fruit etc., but this is not necessary.

The volume has a main volume 70 and an elongate secondary volume 71 which is in communication with the main volume 70 at one end and has at its other end the first openable portion 17. Again, this openable portion may include one or more grippable tabs 18 to enable the films 13, 14 to be peeled apart to enable the liquid to be dispensed. Oppositely disposed to the secondary volume 71 is a tertiary volume 72 which again is in communication with the main volume 70 at one end and has at its other end a second openable portion 55 which also provides one or more grippable tabs 18 in order to make the second opening.

In the basic arrangement illustrated, the main, secondary and tertiary volumes 70, 71, 72 are formed in the second film 14 which has sufficient structural integrity to maintain these volumes in the form of a main cup section and elongate channels to constitute the secondary and tertiary volumes 71, 72. The first film 13 seals all around the edges of the second film 14 by means of heat sealing or welding or adhesive as discussed above.

One particular use of the FIG. 36, 37 arrangement is with tea and coffee vendors. The liquid held in the volume may include one or more of a number of additives or flavours or herbal remedies which can be released into a hot or even cold beverage. The provision of top and bottom (second and first) openable portions allows the liquid to drain from the volume and preferably one or both films are flexible enough to allow squeezing of the pack to remove remaining liquid. The packs could contain substances that are liquid at room temperature or become liquid at an elevated temperature of the sort of level found in hot beverages or the packs could be frozen such that the frozen liquid thaws when used in a hot or cold beverage. For example, the packs could contain lemon juice or a honey/lemon juice combination for gradual infusion into a tea. Even some medicines/herbal remedies could be incorporated to provide, for example, over-the-counter cold relief products.

The modified arrangement of FIG. 38 incorporates the standard first and third seal portions 51, 56 and the stronger second and fourth seal portions 52, 57 discussed earlier in the specification and again these are beneficial to prevent the openable portions 17, 55 from being opened too far.

It will also be appreciated that other sub-volumes could be incorporated in a more complex product. The different sub-volumes could initially contain different liquid products for dispensing through the first openable portion.

In practical terms, in the arrangements of FIGS. 36 to 38, the pack 10 has sufficient rigidity along its length such that the pack retains its elongate shape during use through all operating temperatures. The pack can therefore operate effectively as a stirrer for beverages, perhaps using the pack in the region of the tertiary volume 72 as a handle, whilst simultaneously dispensing the enclosed liquid from the first openable portion 17 which is immersed in a hot or cold or ice-laden beverage. In preferred arrangements, one or both films 13, 14 are made sufficiently rigid by suitable choice of plastic material and/or the thickness of such material. In other arrangements, both films could be substantially flexible with one or both films being provided with a sufficiently rigid spine or spines such that the stirrer retains its elongate shape.

In FIGS. 39a-c, there are shown three stages in the production of an alternative arrangement according to the present invention in which the first and second films 13, 14 are constituted by a single fluid-tight plastic film 90 which is folded along an edge 91 around a product 12 containing a liquid. In this illustrated arrangement, the product 12 is a half slice of lemon with the diameter of the lemon lying adjacent the folded edge 91. After folding over, the single film 90 is heat sealed/welded/adhered to itself in the hatched area 92 so as to enclose the product 12 in a sealed volume defined in part by the folded edge 91 and in part by the sealed area 92. An unsecured grippable tab(s) 18 is provided at the first openable portion 17 for breaking the seal to open the pack.

In addition, and as shown in FIG. 39b, a further connection or stronger seal 50 is provided in the manner discussed above so as to create a stronger second seal portion 52 adjacent a weaker first seal portion 51 in the region of the first openable portion 17, the fold 91 constituting a further second seal portion on the other side of the first openable portion 17. Again, this limits the size of the first opening, ideally to prevent unwanted removal of the product except for the liquid contained therein.

FIG. 39c shows the hatched area 92 trimmed to provide a more manageable and aesthetically pleasing pack 12.

The same single-film process can, of course, be utilised for different sized/shaped products as desired.

In FIGS. 40a-c there are shown the same three stages as for FIG. 40 except that a second openable portion 55 is provided opposite the first openable portion 17 and is defined by third and fourth seal portions 56, 57. As discussed above in relation to the stronger seal 50, the second openable portion 55 can be larger than the first openable portion and can be large enough to enable the product to be removed from the pack either before or after liquid has been removed from the first openable portion.

FIGS. 41 to 43 are very similar to FIGS. 27 to 29 and like features have been given like reference numerals. In the embodiment of FIGS. 41 to 43 there are provided a number of additional connections 100 between the first and second films 13, 14. In this embodiment the additional connections are disposed inwardly of the further connections 50 (the second and fourth seal portions 52, 57). The additional connections 100 may be small spot welds or other connections between the films and may be of intermediate strength. When manipulating/squeezing the fruit, excessive force may rupture one or more of the additional connections 100 to give an early warning prior to possible rupture of the further connections 50.

In another arrangement (not shown) additional, intermediate strength connections between the films could also be utilised to give the first openable portion 17 a two stage opening process. Initial opening is terminated with an increased resistance to peeling apart. Increased effort with peeling apart will then overcome the additional connections 100 on either side of the first openable portion 17 to increase the opening, but complete separation of the films will be prevented by the further connections 50.

It will be appreciated that the illustrated embodiments incorporating formations for improving the dispensing of fluid or particulate matter from the packs can be readily combined such that a pack could incorporate the features of a number of illustrated embodiments thereby to further improve the liquid dispensing properties. Just by way of example, a pack could combine the features of FIGS. 27 to 29 with the features of FIG. 22 and with the features of FIG. 25. Also the packs 10 are not limited to generally flat, disc-like products but could be other shapes. Instead of a slice of fruit or half slice of fruit as illustrated, other sections of fruit could be contained, even two or more pieces within the same pack volume, the two or more pieces being pressed together to aid juice extraction. Even half of a fruit could be contained.

The invention claimed is:

1. A pack comprising a sealed package containing a squeezable product, the package having a first openable portion and being at least partially flexible to enable squeezing of the product to facilitate dispensing of a liquid or particulate material emanating from the product via the first openable portion once opened, wherein the package comprises one or more films which are fluid-tight and which fully enclose a volume in which the product is sealingly retained, wherein said one or more films comprises a flexible first film and a second film, which films are sealingly joined to each other about a periphery thereby forming a peripheral seal fully enclosing said volume in which the product is sealingly retained, wherein the first openable portion comprises at least one of the films having a grippable tab which can be manipulated to peel apart the joint between the films, wherein the first openable portion comprises a first seal portion comprising a first side and a second side, wherein the first seal portion is relatively weak compared to a first second seal portion on the first side of the first seal portion and a second second seal portion on the second side of the first seal portion, whereby the second seal portions resist separation thereby to limit the first openable portion to a first predetermined size, wherein the package has a second openable portion at a position spaced from the first openable portion, the second openable portion comprising at least one of the films having a further grippable tab which can be manipulated to peel apart the joint between the films, wherein the second openable portion comprises a third seal portion comprising a first side and a second side, wherein the third seal portion is relatively weak compared to a first fourth seal portion on the first side of the third seal portion and a second fourth seal portion on the second side of the third seal portion, whereby the fourth seal portions resist separation thereby to limit the second openable portion to a second predetermined size, wherein the second predetermined size is greater than said first predetermined size such that the first predetermined size beyond which the films are resisted from separation prevents passage of the squeezable product through the first openable portion and wherein the second predetermined size by which the films are permitted to separate permits the passage of the squeezable product through the second openable portion, and wherein the first second seal portion is contiguous with the first fourth seal portion, the second second seal portion is contiguous with the second fourth seal portion, and the second and fourth seal portions are spaced from said peripheral seal.

2. The pack as claimed in claim 1 wherein the first openable portion is opposite the second openable portion.

3. The pack as claimed in claim 1 wherein the peripheral seal is heat sealed and the second and fourth seal portions are effected by one or a combination of heat sealing or welding or adhesive.

4. The pack as claimed in claim 1 wherein said first film and said second film are made from food-grade plastics materials and are secured to each other about said periphery by one of, or a combination of, heat sealing or welding or adhesive or folds.

5. The pack as claimed in claim 1 wherein the second film is flexible.

6. The pack as claimed in claim 5 wherein the second film is less flexible than the first film.

7. The pack as claimed in claim 1 wherein the first and second films are constituted by a single folded film, the fold constituting part of said periphery.

8. The pack as claimed in claim 1 wherein one or more additional connections are provided between the first and second films, said one or more additional connections being stronger than the joint between the films in the region of the first openable portion and weaker than the connection on either side of the first openable portion.

9. The pack as claimed in claim 1, wherein the squeezable product is a friable product, wherein the friable product is crushable at least in part to form said particulate material.

10. A pack comprising a sealed package containing a squeezable product, the package having a first openable portion and being at least partially flexible to enable squeezing of the product to facilitate dispensing of a liquid or particulate material emanating from the product via the first openable portion once opened, wherein the package comprises one or more films which are fluid-tight and which fully enclose a volume in which the product is sealingly retained, wherein said one or more films comprises a flexible first film and a second film, which films are sealingly joined to each other about a periphery thereby forming a peripheral seal fully enclosing said volume in which the product is sealingly retained, wherein the first openable portion comprises at least one of the films having a grippable tab which can be manipulated to peel apart the joint between the films, wherein the first openable portion comprises a first seal portion comprising a first side and a second side, wherein the first seal portion is relatively weak compared to a first second seal portion on the first side of the first seal portion and a second second seal portion on the second side of the first seal portion, whereby the second seal portions resist separation thereby to limit the first openable portion to a first predetermined size;
wherein the package has a second openable portion at a position spaced from the first openable portion, the second openable portion comprising at least one of the films having a further grippable tab which can be manipulated to peel apart the joint between the films;
wherein the second openable portion comprises a third seal portion comprising a first side and a second side, wherein the third seal portion is relatively weak compared to a first fourth seal portion on the first side of the third seal portion and a second fourth seal portion on the second side of the third seal portion, whereby the fourth seal portions resist separation thereby to limit the second openable portion to a second predetermined size;
wherein the second predetermined size is greater than said first predetermined size such that the first predetermined size beyond which the films are resisted from separation prevents passage of the squeezable product through the first openable portion and wherein the second predetermined size by which the films are permitted to separate permits the passage of the squeezable product through the second openable portion;
wherein the first and third seal portions are part of the peripheral seal between the two films to enclose said volume and the second and fourth seal portions are in the form of additional joints between the two films; and
wherein the first second seal portion is contiguous with the first fourth seal portion, and the second second seal portion is contiguous with the second fourth seal portion.

11. The pack as claimed in claim 10 wherein the second and fourth seal portions are spaced from said peripheral seal.

12. The pack as claimed in claim 10, wherein the first openable portion is opposite the second openable portion.

13. The pack as claimed in claim 10 wherein the peripheral seal is heat sealed and the second and fourth seal portions are effected by one or a combination of heat sealing or welding or adhesive.

14. The pack as claimed in claim 10 wherein said first film and said second film are made from food-grade plastics materials and are secured to each other about said periphery by one of, or a combination of, heat sealing or welding or adhesive or folds.

15. The pack as claimed in claim 10 wherein the second film is flexible.

16. The pack as claimed in claim 15 wherein the second film is less flexible than the first film.

17. The pack as claimed in claim 10 wherein the first and second films are constituted by a single folded film, the fold constituting part of said periphery.

18. The pack as claimed in claim 10 wherein one or more additional connections are provided between the first and second films, said one or more additional connections being stronger than the joint between the films in the region of the first openable portion and weaker than the connection on either side of the first openable portion.

19. The pack as claimed in claim 10 wherein the squeezable product is a friable product, wherein the friable product is crushable at least in part to form said particulate material.

* * * * *